(12) United States Patent
Kumar et al.

(10) Patent No.: US 12,526,006 B2
(45) Date of Patent: Jan. 13, 2026

(54) TRANSMIT ENERGY ALLOCATION AMONG DIFFERENT RADIOS

(71) Applicant: QUALCOMM Incorporated, San Diego, CA (US)

(72) Inventors: Akshay Kumar, San Diego, CA (US); Arnaud Meylan, San Diego, CA (US); Huang Lou, Santee, CA (US); Farhad Meshkati, San Diego, CA (US); Scott Hoover, Del Mar, CA (US); Yahia Ramadan, San Jose, CA (US); Michel Chauvin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 303 days.

(21) Appl. No.: 18/468,865

(22) Filed: Sep. 18, 2023

(65) Prior Publication Data

US 2024/0106481 A1 Mar. 28, 2024

Related U.S. Application Data

(60) Provisional application No. 63/516,787, filed on Jul. 31, 2023, provisional application No. 63/377,459, filed on Sep. 28, 2022.

(51) Int. Cl.
*H04B 1/3827* (2015.01)
*H04W 36/00* (2009.01)
(Continued)

(52) U.S. Cl.
CPC ...... *H04B 1/3838* (2013.01); *H04W 36/0069* (2018.08); *H04W 52/36* (2013.01); *H04W 76/15* (2018.02)

(58) Field of Classification Search
CPC ............ H04B 1/3838; H04W 36/0069; H04W 52/36; H04W 76/15; H04W 52/146;
(Continued)

(56) References Cited

U.S. PATENT DOCUMENTS

2020/0374882 A1\* 11/2020 Cai ....................... H04W 72/56
2022/0116949 A1\* 4/2022 Nadakuduti ...... H04W 72/0473

OTHER PUBLICATIONS

International Search Report and Written Opinion—PCT/US2023/033176—ISA/EPO—Jan. 4, 2024.

\* cited by examiner

*Primary Examiner* — Ankur Jain
(74) *Attorney, Agent, or Firm* — Dalei Dong; Harrity & Harrity, LLP

(57) ABSTRACT

Certain aspects of the present disclosure provide techniques for transmit energy allocation. A method that may be performed by a wireless device includes establishing first and second wireless communication connections and allocating an available energy between the first and second wireless communication connections by: allocating a first portion of the available energy to the first wireless communication connection based at least in part on one or more functionalities associated with the first wireless communication connection; allocating a second portion of the available energy to the second wireless communication connection based at least in part on one or more functionalities associated with the second wireless communication connection; and allocating a third portion of the available energy to the first and/or the second wireless communication connections based at least in part on energy efficiencies of the first and second wireless communication connections.

30 Claims, 10 Drawing Sheets

(51) Int. Cl.
*H04W 52/36* (2009.01)
*H04W 76/15* (2018.01)

(58) Field of Classification Search
CPC ............. H04W 52/281; H04W 52/346; H04W 36/165; H04W 52/367; Y02D 30/70
See application file for complete search history.

TRANSMIT ENERGY ALLOCATION AMONG DIFFERENT RADIOS

CROSS-REFERENCE TO RELATED APPLICATIONS

The present application claims priority to and the benefit of U.S. Provisional Patent Application No. 63/516,787, filed Jul. 31, 2023, and U.S. Provisional Patent Application No. 63/377,459, filed Sep. 28, 2022, which are hereby incorporated by reference in their entireties as if fully set forth below and for all applicable purposes.

TECHNICAL FIELD

Aspects of the present disclosure relate to wireless communications, and more particularly, to radio frequency (RF) exposure compliance.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Modern wireless devices (such as cellular telephones) are generally mandated to meet radio frequency (RF) exposure limits set by certain governments and international standards and regulations. To ensure compliance with the standards, such devices must currently undergo an extensive certification process prior to being shipped to market. To ensure that a wireless device complies with an RF exposure limit, techniques have been developed to enable the wireless device to assess RF exposure from the wireless device and adjust the transmission power of the wireless device accordingly to comply with the RF exposure limit. For example, Specific Absorption Rate (SAR) and Maximum Permissible Exposure (MPE) are regulatory constraints on the transmit power of signals transmitted by a UE for sub-6/LTE communications and millimeter wave (mmW) communications, respectively. However, maintaining compliance with regulatory constraints such as SAR and MPE may be much more difficult in the context of multiple radios.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later. In this regard, the systems, methods, and devices of the present disclosure each have several aspects, no single one of which is solely responsible for its desirable attributes. Without limiting the scope of this disclosure as expressed by the claims that follow, some features will now be discussed briefly. After considering this discussion, and particularly after reading the section entitled "Detailed Description," one will understand how the features of this disclosure provide advantages that include improved wireless communication performance and/or efficient energy allocation among radios.

In an aspect of the disclosure, a method of wireless communication performed by a user equipment (UE) includes establishing a first wireless communication connection; establishing a second wireless communication connection; and allocating an available energy between the first wireless communication connection and the second wireless communication connection by: allocating a first portion of the available energy to the first wireless communication connection based at least in part on one or more functionalities associated with the first wireless communication connection; allocating a second portion of the available energy to the second wireless communication connection based at least in part on one or more functionalities associated with the second wireless communication connection; and allocating a third portion of the available energy to at least one of the first wireless communication connection or the second wireless communication connection based at least in part on a first energy efficiency of the first wireless communication connection and a second energy efficiency of the second wireless communication connection.

In an additional aspect of the disclosure, a user equipment (UE) includes a memory; a transceiver; and a processor in communication with the memory and the transceiver, wherein the UE is configured to establish a first wireless communication connection; establish a second wireless communication connection; and allocate an available energy between the first wireless communication connection and the second wireless communication connection by allocating a first portion of the available energy to the first wireless communication connection based at least in part on one or more functionalities associated with the first wireless communication connection; allocating a second portion of the available energy to the second wireless communication connection based at least in part on one or more functionalities associated with the second wireless communication connection; and allocating a third portion of the available energy to at least one of the first wireless communication connection or the second wireless communication connection based at least in part on a first energy efficiency of the first wireless communication connection and a second energy efficiency of the second wireless communication connection.

In additional aspect of the disclosure, a user equipment (UE) includes means for establishing a first wireless communication connection; means for establishing a second wireless communication connection; and means for allocating an available energy between the first wireless communication connection and the second wireless communication connection, the means for allocating the available energy including means for allocating a first portion of the available energy to the first wireless communication connection based at least in part on one or more functionalities associated with the first wireless communication connection; means for allocating a second portion of the available energy to the second wireless communication connection based at least in part on one or more functionalities associated with the second wireless communication connection; and means for allocating a third portion of the available energy to at least one of the first wireless communication connection or the second wireless communication connection based at least in part on a first energy efficiency of the first wireless communication connection and a second energy efficiency of the second wireless communication connection.

In an additional aspect of the disclosure, a non-transitory computer-readable medium having program code recorded thereon for wireless communication by a user equipment (UE) is provided, where the program code includes code for causing the UE to establish a first wireless communication connection; code for causing the UE to establish a second wireless communication connection; and code for causing the UE to allocate an available energy between the first wireless communication connection and the second wireless communication connection including code for causing the UE to allocate a first portion of the available energy to the first wireless communication connection based at least in part on one or more functionalities associated with the first wireless communication connection; code for causing the UE to allocate a second portion of the available energy to the second wireless communication connection based at least in part on one or more functionalities associated with the second wireless communication connection; and code for causing the UE to allocate a third portion of the available energy to at least one of the first wireless communication connection or the second wireless communication connection based at least in part on a first energy efficiency of the first wireless communication connection and a second energy efficiency of the second wireless communication connection.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed. In this regard, other aspects and features of the present invention will become apparent to those of ordinary skill in the art, upon reviewing the following description of specific, exemplary aspects of the present invention in conjunction with the accompanying figures. While features of the present invention may be discussed relative to certain aspects and figures below, all aspects of the present invention can include one or more of the advantageous features discussed herein. In other words, while one or more aspects may be discussed as having certain advantageous features, one or more of such features may also be used in accordance with the various aspects of the invention discussed herein. In similar fashion, while exemplary aspects may be discussed below as device, system, or method aspects, it should be understood that such exemplary aspects can be implemented in various devices, systems, and methods.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects. In this regard, other aspects, features, and advantages of the present invention will become apparent to those of ordinary skill in the art, upon reviewing the following description of specific, exemplary examples of the present invention in conjunction with the accompanying figures. While features of the present invention may be discussed relative to certain examples and figures below, all implementations of the present invention can include one or more of the advantageous features discussed herein. In other words, while one or more examples may be discussed as having certain advantageous features, one or more of such features may also be used in accordance with the various other examples of the invention discussed herein. In similar fashion, while exemplary examples may be discussed below as device, system, or method embodiments, it should be understood that such exemplary examples can be implemented in various devices, systems, and methods.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
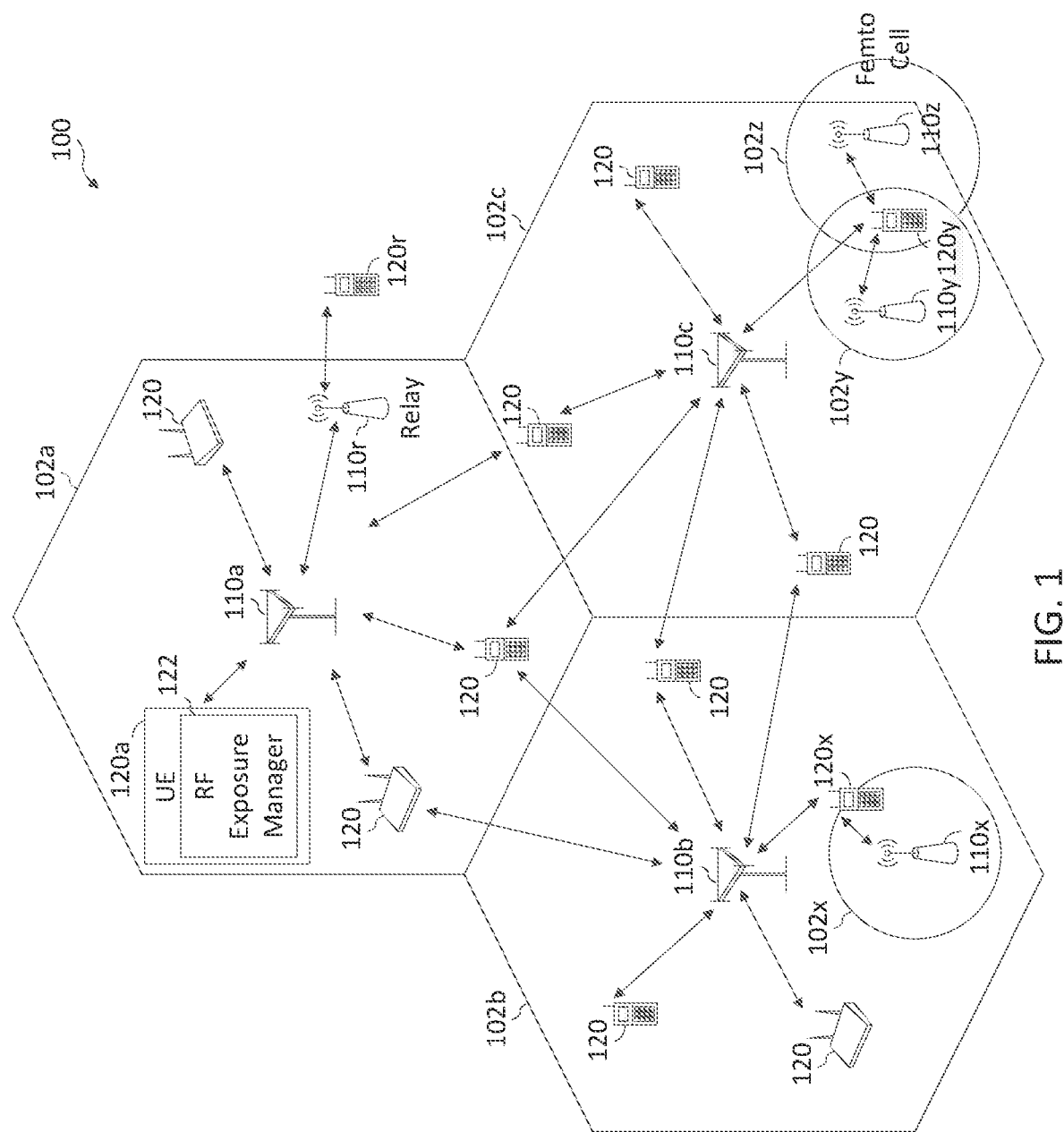
FIG. 1 illustrates a wireless communication network according to some aspects of the present disclosure.

To limit radiation exposure to human tissue, some wireless devices (e.g., user equipments (UEs)) must comply with various constraints set by regulatory agencies, such as the Federal Communications Commission. For example, Specific Absorption Rate (SAR) and Maximum Permissible Exposure (MPE) are regulatory constraints on the transmit power of signals transmitted by a UE for sub-6/Long Term Evolution (LTE) communications and millimeter wave (mmW) communications, respectively. To remain compliant with these constraints, UEs may monitor transmit powers using a time averaged mode (e.g., by monitoring time averaged transmit powers (moving time averaged) for uplink communications and adjusting transmit powers to remain compliant) and/or peak mode (e.g., ensuring that any transmit power does not exceed a maximum limit).

However, maintaining compliance with regulatory constraints such as SAR and MPE is much more difficult when multiple radios are in use, including in the context of dual connectivity, carrier aggregation, and/or multi-SIM scenarios. In such cases, the UE may communicate via multiple wireless communication connections (e.g., links), where the total transmit power across the UE may be split up between the respective wireless communication connections. Some techniques for maintaining transmit power compliance include allocating transmit power across the multiple wireless communication connections based on which wireless communication connection includes voice traffic. These conventional techniques, however, may reduce uplink throughput at the UE when the link including the voice traffic is energy inefficient relative to another wireless communication connection.

Accordingly, aspects of the present disclosure support techniques for dynamically allocating transmit power (e.g., an available energy) across multiple wireless communication connections (e.g., to radios associated with each wireless communication connection) at a UE based, at least in part, on a relative energy efficiency of each of the wireless communication connections. For example, a UE may communicate via a first wireless communication connection and a second wireless communication connection. In this example, the UE may allocate transmit powers to each of the first and second wireless communication connections based on a comparison of an energy efficiency associated with each of the wireless communication connections. For instance, if the first wireless communication connection exhibits a higher energy efficiency (e.g., more energy efficient) than the second wireless communication connection, then the UE may allocate a higher transmit power to the first wireless communication connection in order to increase an uplink throughput of the UE while maintaining compliance with relevant regulatory constraints (e.g., SAR, MPE). This approach may be applied to any number of wireless communication connections/radios in accordance with the present disclosure.

In some instances, the UE may adjust the amount of energy allocated to the radios associated with the wireless communication connections in an effort to equalize the energy efficiency of each of the wireless communication connections. That is, the UE may allocate energy between the wireless communication connections in an effort to minimize a difference between the energy efficiencies of the wireless communication connections. In this regard, the UE may evaluate the energy efficiency of each wireless communication connection based on one or more of the amount of energy required to transmit a certain amount of data (e.g., energy per byte) over the wireless communication connection, a power compliance limit (e.g., $P_{max}$, $P_{limit}$, etc.) associated with the wireless communication connection, a path loss associated with the wireless communication connection, a throughput associated with the wireless communication connection, a bandwidth associated with the wireless communication connection, an amount of unutilized energy associated with the wireless communication connection, and/or other power usage and/or data transmission parameters. As used herein, "energy efficiency" may refer to one or more parameters and/or calculations indicative, either directly or indirectly, of an amount of energy utilized by a device to transmit an amount of data.

In some instances, the UE may determine and/or evaluate the energy efficiency of each the wireless communication connections during one or more monitoring periods or energy measurement periods. In some aspects, the energy measurement periods may be periodic (e.g., occurring every 100 ms, 500 ms, 1000 ms, or other suitable interval). In some instances, the UE may determine to utilize an energy efficiency determination or calculation from a previous energy measurement period instead of a current energy measurement period for one or more of the wireless communication connections. For example, in some instances a current energy measurement period may not be suitable to use as indicator of the efficiency of a wireless communication connection. For example, if the energy measurement period does not include any UL grants and/or UL data, the energy measurement period includes insufficient UL grants and/or UL data (e.g., below (or equal to) a threshold number of UL grants and/or below (or equal to) a threshold amount of UL data), and/or one or more antennas are switched to a different antenna group/radio for the energy measurement period, then the energy measurement period may not provide an accurate indication of the energy efficiency of the wireless communication connection. In such instances, the UE may utilize the energy efficiency from a previous energy measurement period (e.g., the most recent energy measurement period where a suitable energy efficiency was determined). The UE may continue to utilize the energy efficiency from the previous energy measurement period until a time period expires (e.g., based on time correlation associated with the wireless communication connection, a predetermined amount of time, a timer, etc.).

In some instances, the UE may allocate the available energy between the wireless communication connections based, at least in part, on a default energy allocation. For example, in some instances upon establishing a second (or third or additional) wireless communication connection, the UE may initially allocate the energy between the radios associated with the wireless communication connections in accordance with a default energy allocation. Similarly, immediately after a handover, the UE may allocate the energy between the radios associated with the wireless communication connections in accordance with a default energy allocation. Further, if the UE is utilizing an energy efficiency from a previous energy measurement period and the associated time period for using the previous energy measurement period expires (e.g., based on time correlation associated with the wireless communication connection, a predetermined amount of time, a timer, etc.), then the UE may revert to using the default energy allocation until an energy measurement period occurs that is suitable to use as indicator of the efficiency of the wireless communication connection.

Aspects of the present disclosure are applicable to various types of radio access technologies (RATs), including without limitation wireless wide area network (WWAN) (e.g., Long Term Evolution (LTE) or Fifth Generation New Radio (5G NR)), Bluetooth, IEEE 802.11 (e.g., WiFi), satellite communications, device-to-device (e.g., sidelink) communications, vehicle-to-everything (V2X) communications, etc. In this regard, as used herein, a radio or a wireless communication connection may refer to one or more active bands, transceivers, and/or radio access technologies (RATs) (e.g., code division multiple access (CDMA), LTE, NR, IEEE 802.11, Bluetooth, etc.) used for wireless communications. For example, for uplink carrier aggregation in LTE and/or NR, each of the active component carriers used for wireless communications may be treated as a separate radio or wireless communication connection. Similarly, multi-band transmissions for IEEE 802.11 communications or other multi-band communications may be treated as separate radios or wireless communication connection for each band (e.g., 2.4 GHz, 5 GHz, or 6 GHz). Likewise, for multi-SIM transmissions, transmissions via each SIM may be treated as a separate radio or wireless communication connection. The techniques of the present disclosure are suitable for a wide range of communication applications, including full buffer applications (e.g., iPerf communications) and/or bursty applications (e.g., gaming communications).

The apparatus and methods for allocating transmit energy among different wireless communication connections/radios as described herein may facilitate improved wireless communication performance (e.g., improved signal quality at the receiver, lower latencies, higher throughput, etc.). For example, a wireless device may allocate portions of a minimum reserve energy to the radios that are actively transmitting based on functionalities of the radios (e.g., essential functions) and allocate any remaining portion of the minimum reserve energy and/or any available excess energy based on the energy efficiency of the radios. Such an allocation may allow the radios actively transmitting to obtain energy levels that facilitate improved wireless communication performance, including in the context of multi-RAT, dual connectivity, carrier aggregation, multi-band, multi-SIM, and/or combinations thereof, while complying with applicable radio exposure requirements.

The following description provides examples of energy allocation between radios/wireless communication connections for RF exposure compliance in wireless communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area (e.g., in order to avoid interference between wireless networks of different RATs) or may support multiple RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems and/or to wireless technologies such as 802.11, 802.15, etc.

NR access may support various wireless communication services, such as enhanced mobile broadband (eMBB) targeting wide bandwidth (e.g., 80 MHz or beyond), millimeter wave (mmWave) targeting high carrier frequency (e.g., 24 GHz to 53 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTIs) to meet respective quality of service (QoS) requirements. In addition, these services may co-exist in the same subframe. NR supports beamforming, and beam direction may be dynamically configured. Multiple-input, multiple-output (MIMO) transmissions with precoding may also be supported, as may multi-layer transmissions. Aggregation of multiple cells may be supported.

Example Wireless Communication Network and Devices

FIG. 1 illustrates an example wireless communication network 100 in which aspects of the present disclosure may be performed. For example, the wireless communication network 100 may be an NR system (e.g., a 5G NR network), an Evolved Universal Terrestrial Radio Access (E-UTRA) system (e.g., a 4G network), a Universal Mobile Telecommunications System (UMTS) (e.g., a 2G/3G network), or a code division multiple access (CDMA) system (e.g., a 2G/3G network), or may be configured for communications according to an IEEE standard such as one or more of the 802.11 standards, etc. As shown in FIG. 1, the UE 120a includes an RF exposure manager 122 that ensures RF exposure compliance using reserves allocated to radios per antenna group, in accordance with aspects of the present disclosure.

As illustrated in FIG. 1, the wireless communication network 100 may include a number of BSs 110a-z (each also individually referred to herein as BS 110 or collectively as BSs 110) and other network entities. A BS 110 may provide communication coverage for a particular geographic area, sometimes referred to as a "cell," which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless communication connection, a virtual network, or the like) using any suitable transport network. In the example shown in FIG. 1, the BSs 110a, 110b, and 110c may be macro BSs for the macro cells 102a, 102b, and 102c, respectively. The BS 110x may be a pico BS for a pico cell 102x. The BSs 110y and 110z may be femto BSs for the femto cells 102y and 102z, respectively. A BS may support one or multiple cells.

The BSs 110 communicate with UEs 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may be in communication with a set of BSs 110 and provide coordination and control for these BSs 110 (e.g., via a backhaul). In certain cases, the network controller 130 may include a centralized unit (CU) and/or a distributed unit (DU), for example, in a 5G NR system. In aspects, the network controller 130 may be in communication with a core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

In some instances, a BS 110 may have a disaggregated architecture that includes one or more central units (CUs) that can communicate directly with a core network via a backhaul link, or indirectly with the core network through one or more disaggregated base station units (such as a Near-Real Time (Near-RT) RAN Intelligent Controller (RIC) via an E2 link, or a Non-Real Time (Non-RT) RIC associated with a Service Management and Orchestration (SMO) Framework, or both). A CU may communicate with one or more distributed units (DUs) via respective midhaul links, such as an F1 interface. The DUs may communicate with one or more radio units (RUs) via respective fronthaul links. The RUs may communicate with respective UEs 120 via one or more radio frequency (RF) access links. In some implementations, the UE 120 may be simultaneously served by multiple RUs.

Figure 2:
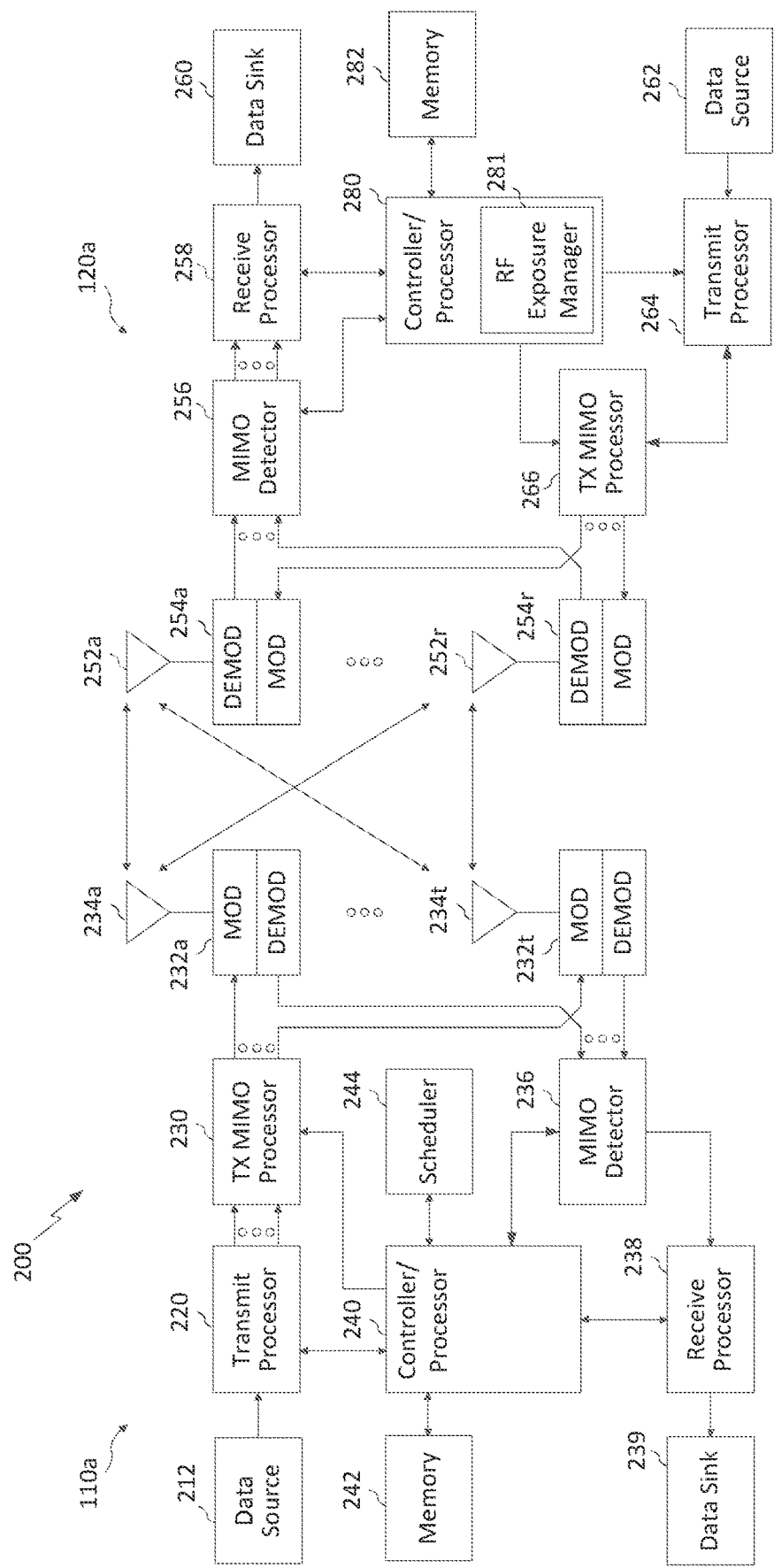
FIG. 2 illustrates a base station (BS) and user equipment (UE) according to some aspects of the present disclosure.

FIG. 2 illustrates example components of BS 110a and UE 120a (e.g., the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a PDSCH, a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), PBCH demodulation reference signal (DMRS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM, etc.) to obtain an output sample stream. Each of the transceivers 232a-232t may further process (e.g., convert to analog, amplify, filter, and upconvert) the output sample stream to obtain a downlink signal. Downlink signals from the transceivers 232a-232t may be transmitted via the antennas 234a-234t, respectively.

At the UE 120a, the antennas 252a-252r may receive the downlink signals from the BS 110a and may provide received signals to the transceivers 254a-254r, respectively. The transceivers 254a-254r may condition (e.g., filter, amplify, downconvert, and digitize) a respective received signal to obtain input samples. Each demodulator (DEMOD) in the transceivers 232a-232t may further process the input samples (e.g., for OFDM, etc.) to obtain received symbols. A MIMO detector 256 may obtain received symbols from all the demodulators in transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH)) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators (MODs) in transceivers 254a-254r (e.g., for SC-FDM, etc.), and transmitted to the BS 110a. At the BS 110a, the uplink signals from the UE 120a may be received by the antennas 234, processed by the demodulators in transceivers 232a-232t, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. As shown in FIG. 2, the controller/processor 280 of the UE 120a has an RF exposure manager 281 that is representative of the RF exposure manager 122, according to aspects described herein. Although shown at the controller/processor, other components of the UE 120a and BS 110a may be used to perform the operations described herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The system bandwidth may also be partitioned into subbands. For example, a subband may cover multiple resource blocks (RBs).

While the UE 120a is described with respect to FIGS. 1 and 2 as communicating with a BS and/or within a network, the UE 120a may be configured to communicate directly with/transmit directly to another UE 120, or with/to another wireless device without relaying communications through a network. In some aspects, the BS 110a illustrated in FIG. 2 and described above is an example of another UE 120.

Example RF Transceiver

Figure 3:
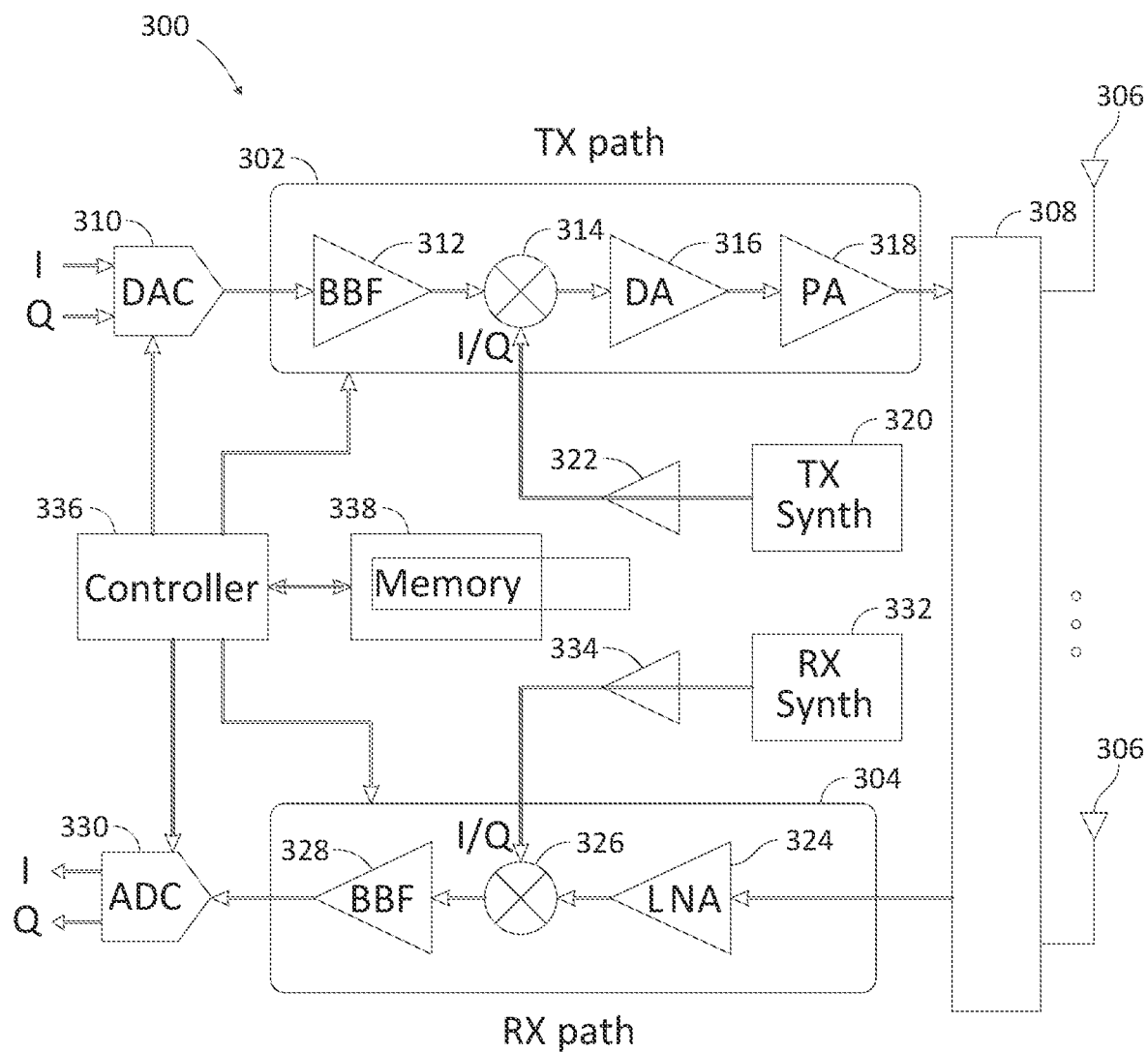
FIG. 3 illustrates a radio frequency (RF) transceiver according to some aspects of the present disclosure.

FIG. 3 is a block diagram of an example RF transceiver circuit 300, in accordance with certain aspects of the present disclosure. The RF transceiver circuit 300 includes at least one transmit (TX) path 302 (also known as a transmit chain) for transmitting signals via one or more antennas 306 and at least one receive (RX) path 304 (also known as a receive chain) for receiving signals via the antennas 306. When the TX path 302 and the RX path 304 share an antenna 306, the paths may be connected with the antenna via an interface 308, which may include any of various suitable RF devices, such as a switch, a duplexer, a diplexer, a multiplexer, and the like.

Receiving in-phase (I) or quadrature (Q) baseband analog signals from a digital-to-analog converter (DAC) 310, the TX path 302 may include a baseband filter (BBF) 312, a mixer 314, a driver amplifier (DA) 316, and a power amplifier (PA) 318. The BBF 312, the mixer 314, and the DA 316 may be included in one or more radio frequency integrated circuits (RFICs). The PA 318 may be external to the RFIC(s) for some implementations.

The BBF 312 filters the baseband signals received from the DAC 310, and the mixer 314 mixes the filtered baseband signals with a transmit local oscillator (LO) signal to convert the baseband signal of interest to a different frequency (e.g., upconvert from baseband to a radio frequency). This frequency conversion process produces the sum and difference frequencies between the LO frequency and the frequencies of the baseband signal of interest. The sum and difference frequencies are referred to as the beat frequencies. The beat frequencies are typically in the RF range, such that the signals output by the mixer 314 are typically RF signals, which may be amplified by the DA 316 and/or by the PA 318 before transmission by the antenna 306. While one mixer 314 is illustrated, several mixers may be used to upconvert the filtered baseband signals to one or more intermediate frequencies and to thereafter upconvert the intermediate frequency signals to a frequency for transmission.

The RX path 304 may include a low noise amplifier (LNA) 324, a mixer 326, and a baseband filter (BBF) 328. The LNA 324, the mixer 326, and the BBF 328 may be included in one or more RFICs, which may or may not be the same RFIC that includes the TX path components. RF signals received via the antenna 306 may be amplified by the LNA 324, and the mixer 326 mixes the amplified RF signals with a receive local oscillator (LO) signal to convert the RF signal of interest to a different baseband frequency (e.g., downconvert). The baseband signals output by the mixer 326 may be filtered by the BBF 328 before being converted by an analog-to-digital converter (ADC) 330 to digital I or Q signals for digital signal processing.

Certain transceivers may employ frequency synthesizers with a voltage-controlled oscillator (VCO) to generate a stable, tunable LO with a particular tuning range. Thus, the transmit LO may be produced by a TX frequency synthesizer 320, which may be buffered or amplified by amplifier 322 before being mixed with the baseband signals in the mixer 314. Similarly, the receive LO may be produced by an RX frequency synthesizer 332, which may be buffered or amplified by amplifier 334 before being mixed with the RF signals in the mixer 326.

A controller 336 may direct the operation of the RF transceiver circuit 300, such as transmitting signals via the TX path 302 and/or receiving signals via the RX path 304. The controller 336 may be a processor, a digital signal processor (DSP), an application specific integrated circuit (ASIC), a field programmable gate array (FPGA) or other programmable logic device (PLD), discrete gate or transistor logic, discrete hardware components, or any combination thereof. The memory 338 may store data and program codes for operating the RF transceiver circuit 300. The controller 336 and/or memory 338 may include control logic. In certain cases, the controller 336 may determine a transmit power applied to the TX path 302 (e.g., certain levels of gain at the PA 318) that complies with an RF exposure limit set by country-specific regulations and/or international standards as further described herein.

Example RF Exposure Compliance

RF exposure may be expressed in terms of a specific absorption rate (SAR), which measures energy absorption by human tissue per unit mass and may have units of watts per kilogram (W/kg). RF exposure may also be expressed in terms of power density (PD), which measures energy absorption per unit area and may have units of mW/cm$^2$. In certain cases, a maximum permissible exposure (MPE) limit in terms of PD may be imposed for wireless devices using transmission frequencies above 6 GHz. The MPE limit is a regulatory metric for exposure based on area, e.g., an energy density limit defined as a number, X, watts per square meter (W/m$^2$) averaged over a defined area and time-averaged over a frequency-dependent time window in order to prevent a human exposure hazard represented by a tissue temperature change.

SAR may be used to assess RF exposure for transmission frequencies less than 6 GHz, which covers wireless communication technologies such as 2G/3G (e.g., CDMA), 4G (e.g., LTE), 5G (e.g., NR in 6 GHz bands), IEEE 802.11ac, etc. PD may be used to assess RF exposure for transmission frequencies higher than 6 GHz, which covers wireless communication technologies such as IEEE 802.11ad, 802.11ay, 5G in mmWave bands, etc. Thus, different metrics may be used to assess RF exposure for different wireless communication technologies and/or frequency ranges.

A wireless device (e.g., UE 120) may simultaneously transmit signals using multiple wireless communication technologies. For example, the wireless device may simultaneously (or within a common transmission window) transmit signals using a first wireless communication technology operating at or below 6 GHz (e.g., 3G, 4G, 5G, etc.) and a second wireless communication technology operating above 6 GHz (e.g., mmWave 5G in 24 to 60 GHz bands, IEEE 802.11ad or 802.11ay). In certain aspects, the wireless device may simultaneously (or within a common transmission window) transmit signals using the first wireless communication technology (e.g., 3G, 4G, 5G in sub-6 GHz bands, IEEE 802.11ac, etc.) in which RF exposure is measured in terms of SAR, and the second wireless communication technology (e.g., 5G in 24 to 60 GHz bands, IEEE 802.11ad, 802.11ay, etc.) in which RF exposure is measured in terms of PD. As used herein, sub-6 GHz bands may include frequency bands of 300 MHz to 6,000 MHz in some examples and may include bands in the 6,000 MHz and/or 7,000 MHz range in some examples.

In certain cases, compliance with an RF exposure limit may be performed as a time-averaged RF exposure evaluation within a specified time window (T) (e.g., 2 seconds for 60 GHz bands, 100 or 360 seconds for bands ≤6 GHz, etc.) associated with the RF exposure limit. In this regard, FIGS. 4A, 4B, and 4C illustrate transmit powers over time in compliance with an RF exposure limit according to some aspects of the present disclosure.

Figure 4A:
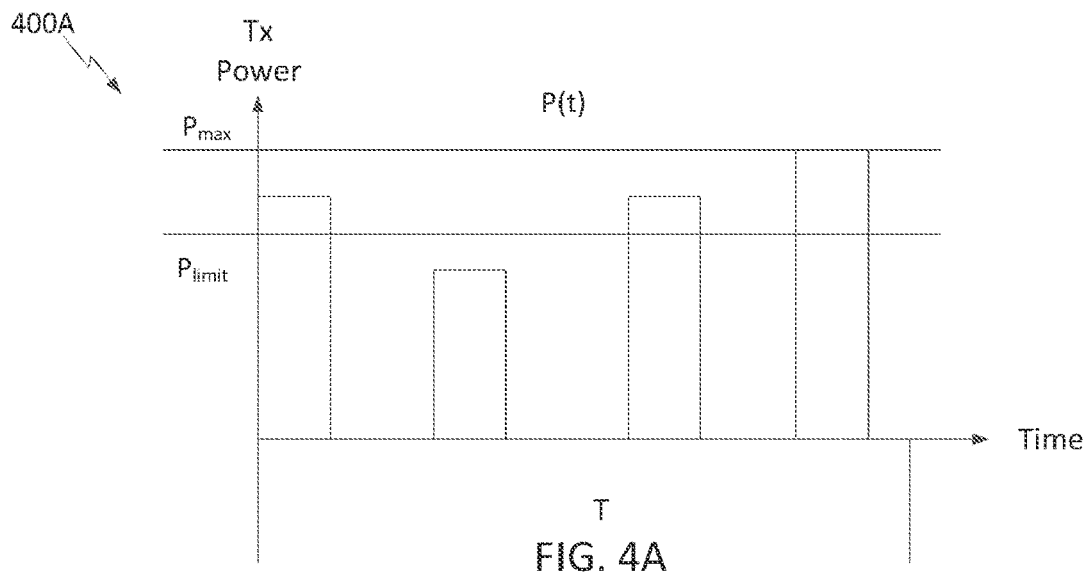
FIGS. 4A, 4B, and 4C illustrate transmit powers over time in compliance with an RF exposure limit according to some aspects of the present disclosure.
Figure 4B:
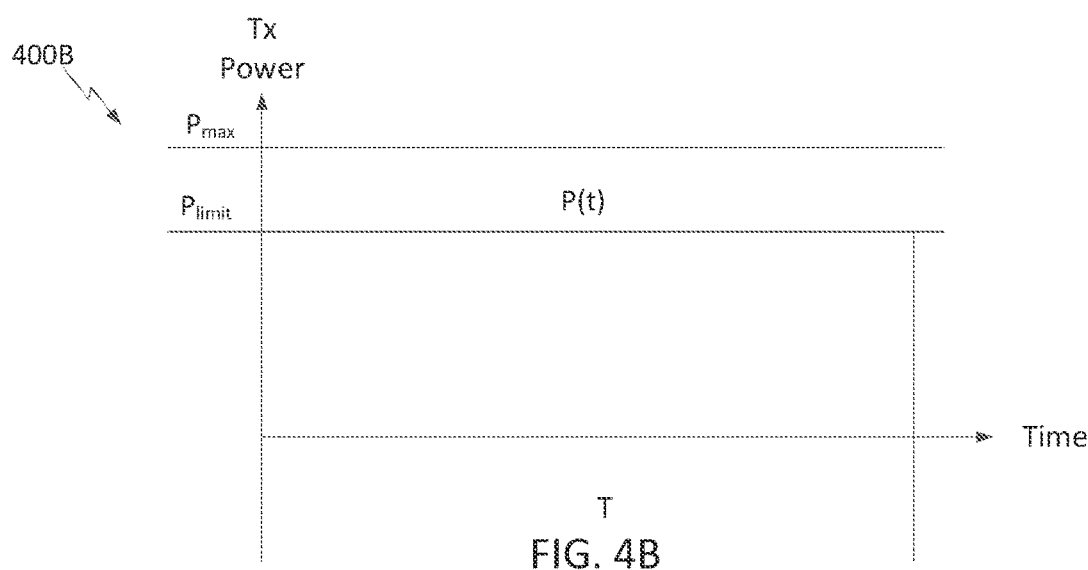

FIG. 4A includes a graph 400A of a transmit power over time (P(t)) that varies over a time window (T) associated with the RF exposure limit, in accordance with certain aspects of the present disclosure. As an example, the instantaneous transmit power may exceed a maximum time-averaged transmit power level $P_{limit}$ in certain transmission occasions in the time window (T). That is, the transmit power may be greater than the maximum time-averaged transmit power level $P_{limit}$. In certain cases, the UE may transmit at $P_{max}$, which is the maximum transmit power supported by the UE. In certain cases, the UE may transmit at a transmit power less than or equal to the maximum time-averaged transmit power level $P_{limit}$ in certain transmission occasions. The maximum time-averaged transmit power level $P_{limit}$ represents the time-averaged threshold in terms of transmit power for the RF exposure limit over the time window (T), and in certain cases, $P_{limit}$ may be referred to as the maximum time-averaged power level or limit, or in terms of exposure, the maximum time-averaged RF exposure level or limit. The graph 400A also illustrates gaps between transmission bursts, where the gaps represent periods during which no transmission was output from the device.

In certain cases, the transmit power may be maintained at the maximum time-averaged transmit power level (e.g., $P_{limit}$) allowed for RF exposure compliance that enables continuous transmission during the time window. For example, FIG. 4B include a graph 400B of a transmit power over time (P(t)) illustrating an example where the transmit power is limited to $P_{limit}$, in accordance with certain aspects of the present disclosure. As shown, the UE can transmit continuously at $P_{limit}$ in compliance with the RF exposure limit.

Figure 4C:
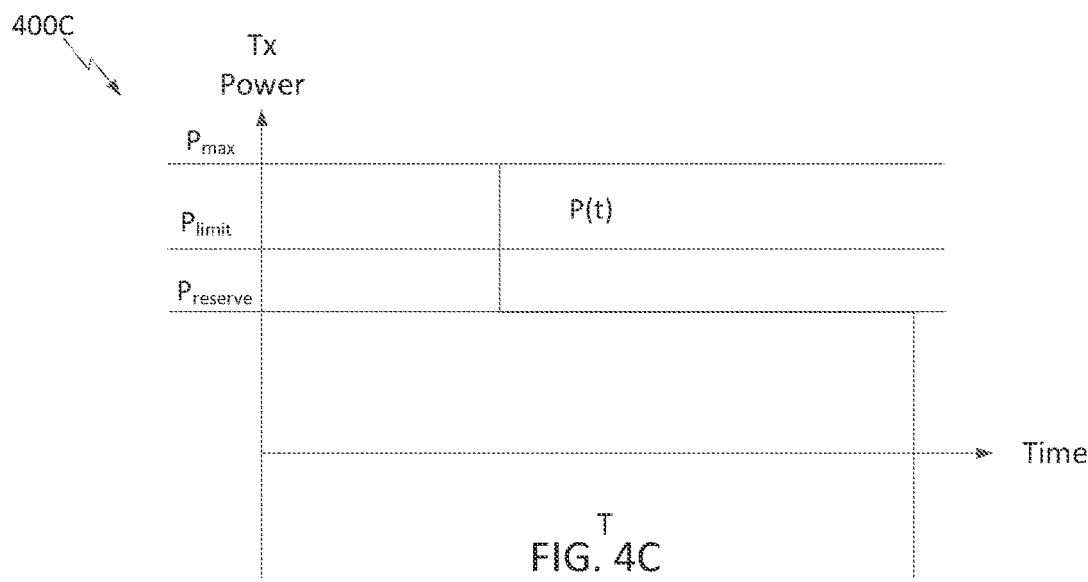

FIG. 4C includes a graph 400C of a transmit power over time (P(t)) illustrating a time-average mode that provides a reserve power to enable a continuous transmission within the time window (T), in accordance with certain aspects of the present disclosure. As shown, the transmit power may be backed off from the maximum instantaneous power ($P_{max}$) to a reserve power ($P_{reserve}$) so that the UE can continue transmitting at the lower power ($P_{reserve}$) to maintain a continuous transmission during the time window (e.g., maintain a radio connection with a receiving entity). In FIG. 4C, the area between $P_{max}$ and $P_{reserve}$ for the time duration of $P_{max}$ may be equal to the area between $P_{limit}$ and $P_{reserve}$ for the time window T, such that the area of transmit power (P(t)) in FIG. 4C is equal to the area of $P_{limit}$ for the time window T. Such an area may be considered using 100% of the energy (transmit power or exposure) to remain compliant with the time-averaged RF exposure limit. Without the reserve power $P_{reserve}$, the transmitter may transmit at $P_{max}$ for a portion of the time window with the transmitter turned off for the remainder of the time window to ensure compliance with the time-averaged RF exposure limit. In some aspects, $P_{reserve}$ is set at a fixed power used to serve for a purpose (e.g., reserving power for certain communications). The transmit duration at $P_{max}$ may be referred to as the burst transmit time (or high power duration). When more margin is available in the future (after T seconds), the transmitter may be allowed to transmit at a higher power again (e.g., in short bursts at $P_{max}$).

In some aspects, the UE may transmit at a power that is higher than the average power level, but less than $P_{max}$ in the time-average mode illustrated in FIG. 4C. While a single transmit burst is illustrated in FIG. 4C, it will be understood that the UE may instead utilize a plurality of transmit bursts within the time window (T), for example, as described herein with respect to FIG. 4A, where the transmit bursts may be separated by periods during which the transmit power is maintained at or below $P_{reserve}$. Further, it will be understood that the transmit power of each transmit burst may vary (either within the burst and/or in comparison to other bursts), and that at least a portion of the burst may be transmitted at a power above the maximum average power level (e.g., $P_{limit}$).

While FIGS. 4A-4C illustrate continuous transmission over a window, occasion, burst, etc., it will be understood that a duty cycle for transmission may be implemented. In such implementations, a transmit power may be zero periodically and maintained at a higher level (e.g., a level as illustrated in FIGS. 4A-4C) during other portions of the duty cycle. As used herein, the duty cycle of the transmission may refer to a portion (e.g., 5 ms) of a specific period (e.g., 500 ms) in which one or more signals are transmitted. In certain cases, the duty cycle may be standardized (e.g., predetermined) with a specific RAT and/or vary over time, for example, due to changes in radio conditions, mobility, and/or user behavior.

In certain cases, the wireless device may evaluate RF exposure compliance in terms of one or more antenna groups, where an antenna group may be a collection of antennas and/or antenna modules. The antenna groups may be treated mutually exclusive of each other in terms of RF exposure. For example, the wireless device may evaluate the RF exposure compliance for an antenna group independently of the RF exposure compliance for another antenna group. The antennas and/or antenna modules may support multiple RATs.

Figure 5:
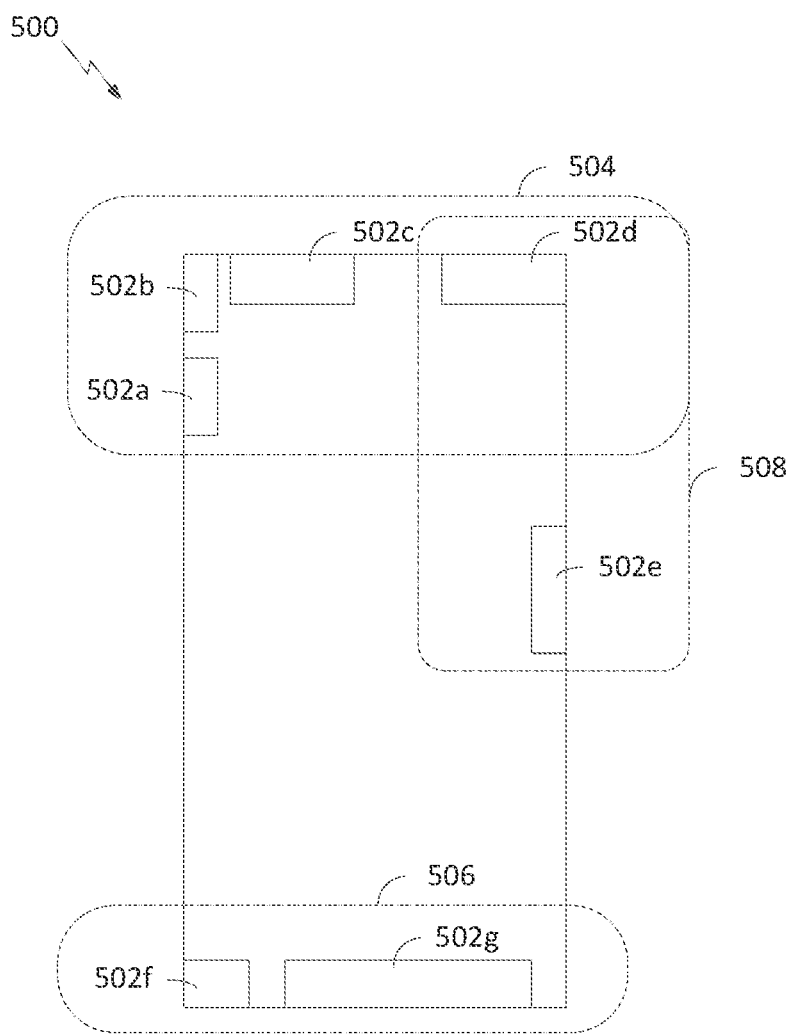
FIG. 5 illustrates groupings of multiple antennas of a wireless communication device according to some aspects of the present disclosure.

FIG. 5 illustrates groupings of multiple antennas of a wireless communication device 500, in accordance with certain aspects of the present disclosure. In this example, the wireless communication device 500 (e.g., a UE 120, such as a smartphone, or any of the wireless communication devices described herein) includes a first antenna 502a, a second antenna 502b, a third antenna 502c, a fourth antenna 502d, a fifth antenna 502e, a sixth antenna 502f, and a seventh antenna 502g. The antennas 502a-502g are arranged into three antenna groups 504, 506, 508, which roughly correspond to a top of the wireless communication device 500, a bottom of the wireless communication device 500, and a side of the wireless communication device 500, when the wireless communication device 500 is held in the upright position. Those of skill in the art will appreciate that more or less than seven antennas may be implemented, and/or more or less than three antenna groupings may be defined. Each of the illustrated antennas 502a-502g may represent a single antenna, an array (e.g., a phased array) of antennas, or a module including one or more antennas. The antenna groups 504, 506, 508 may each include one or more antennas that are configured to transmit in a certain frequency band (e.g., very high (e.g., mmWave bands), high (e.g., 6-7 GHz bands), medium (e.g., 3-6 GHz bands), or low (e.g., 400 MHz-3 GHz bands)), or the antenna groups may each include one or more antennas that are configured to transmit in multiple frequency bands.

In some aspects, the antenna groupings described herein may be assigned into various antenna groupings (such as a mmWave grouping, a sub-6 GHz grouping, a low band grouping (e.g., 400 MHz-3 GHz bands), a mixed-mode grouping (e.g., mmWave and sub-6 GHz grouping), a multi-RAT grouping (e.g., WWAN and WLAN), groupings for different exposure scenarios and/or device positions relative to the user's body, etc.), for example, for differing transmit scenarios. As an example, under a mmWave grouping, each mmWave module (e.g., the first antenna 502a, the third antenna 502c, and the fifth antenna 502e) may be treated as a separate antenna group, where each mmWave module may have multiple antenna elements (e.g., 64 dual polarization antenna elements) arranged in one or more arrays. The mmWave module may be capable of transmitting various beams via predefined antenna configurations, where the beams may form a codebook. Under a sub-6 GHz grouping, sub-6 GHz antennas may be grouped into separate groups. For example, the second antenna 502b and fourth antenna 502d may be assigned to a group, and the sixth antenna 502f and seventh antenna 502g may be assigned to another group. In certain cases, the antennas 502a-502g may be assigned to a mixed-mode grouping, such as the three antenna groups 504, 506, 508. Each antenna may be included in a separate antenna group, as illustrated, or one or more antennas may be included in multiple antenna groups. In the illustrated example, the fourth antenna 502d is part of both antenna groups 504 and 508. Accordingly, in some aspects the fourth antenna 502d may transition between operating as part of antenna group 504 and operating as part of antenna group 508.

The antenna groups may be defined and/or operated so as to be mutually exclusive in terms of RF exposure. In certain aspects, the transmit power of one or more of the antenna groups (or of one or more of the antennas within one or more groups) may be reduced such that the (normalized) sum of the exposure of all antenna groups, or of the overlapped RF exposure distributions, are less than a particular value (e.g., 1.0). In certain cases, a wireless device may evaluate RF exposure compliance for two or more radios of a specific RAT (e.g., LTE or 5G NR) or a class of RATs, such as WWAN access technologies (e.g., LTE and 5G NR). The wireless device may be configured with a minimum reserve.

Figure 6:
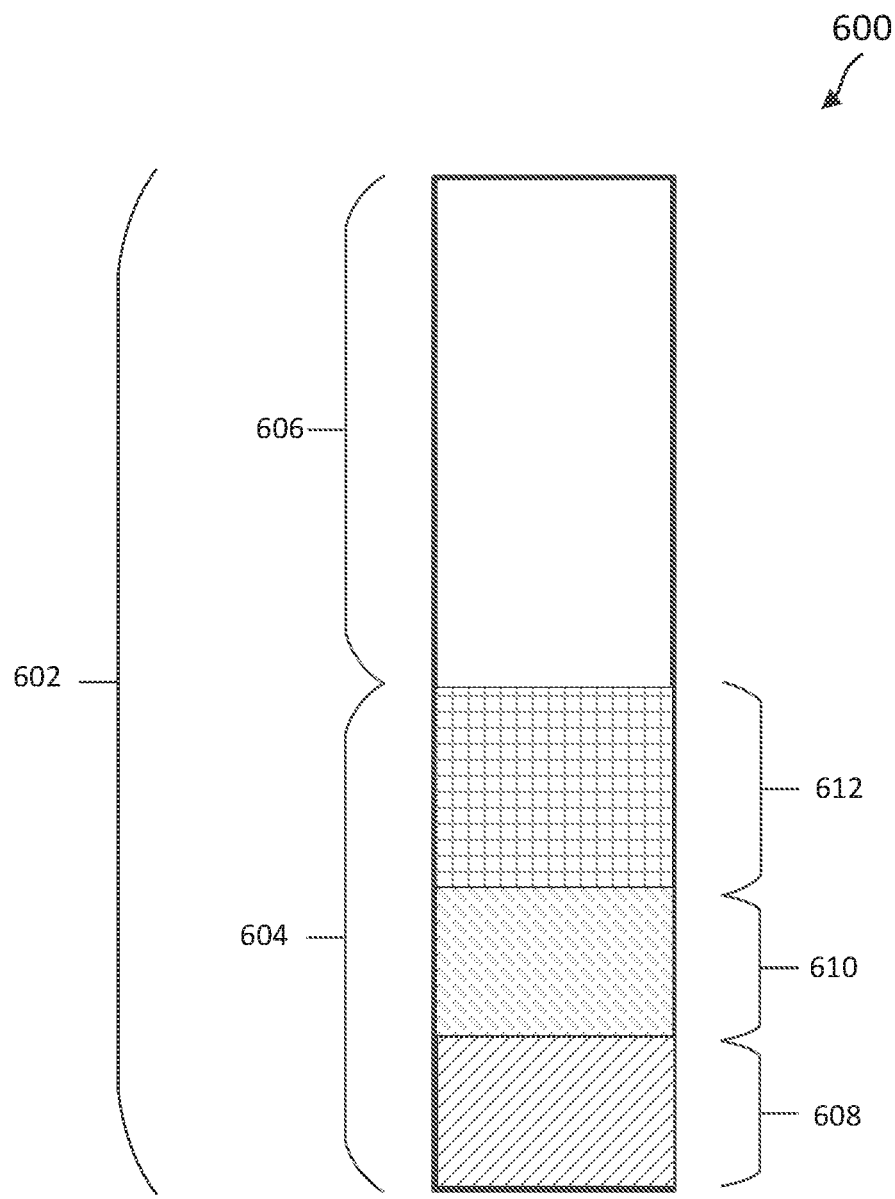
FIG. 6 illustrates a power allocation configuration according to some aspects of the present disclosure.

FIG. 6 illustrates a power allocation configuration 600 according to some aspects of the present disclosure. The power allocation configuration 600 includes a total available energy 602. The total available energy 602 may be the total amount of energy available to be allocated to one or more radios for a certain duration (e.g., a transmission occasion or a time window associated with a (time-averaged or peak) RF exposure limit). The total available energy 602 may be the total amount of energy available to be allocated to one or more radios associated with a common antenna group (e.g., antenna groups 504, 506, 508). The total available energy 602 may include a minimum reserve energy 604 and an excess energy 606. As used herein, a "minimum reserve" or "reserve" may refer to a minimum level of transmit power allocated to one or more radios for a certain duration (e.g., a transmission occasion or a time window associated with a (time-averaged or peak) RF exposure limit). The minimum reserve energy 604 may be configured in terms of a normalized exposure level. In some instances, the size of the minimum reserve energy 604 may be set determined and/or set by a device manufacturer or operator. In some aspects, the minimum reserve energy 604 may be between about 0.1 and about 0.9 of the total available energy 602, including without limitation 0.25, 0.3. 0.4. 0.5. 0.6. 0.7. 0.75. The excess energy 606 may refer to the remaining energy of the total available energy 602 that is not part of the minimum reserve energy 604.

In some instances, the minimum reserve energy 604 and/or the excess energy 606 may be allocated between two or more radios. For example, the minimum reserve energy 604 and/or the excess energy 606 may be split among multiple radios when multiple wireless communication connections associated with the radios are active. When multiple radios are transmitting at the same time, the wireless device may divide the minimum reserve among the radios.

In some instances, the wireless device may allocate a first portion 608 of the minimum reserve energy 604 to a first wireless communication connection/radio based, at least in part, on one or more functionalities associated with the first wireless communication connection. The first portion 608 of the minimum reserve energy 604 may be the amount of energy needed for the first wireless communication connection/radio to perform the one or more functionalities. In this regard, the functionalities may include control channel functionality, random access channel functionality, voice, communication functionality, video communication functionality, signaling radio bearer (SRB) functionality, and/or other functionality.

In some instances, the wireless device may allocate a second portion 610 of the minimum reserve energy 604 to a second wireless communication connection/radio based, at least in part, on one or more functionalities associated with the second wireless communication connection. The second portion 610 of the minimum reserve energy 604 may be the amount of energy needed for the second wireless communication connection/radio to perform the one or more functionalities. In this regard, the functionalities may include control channel functionality, random access channel functionality, voice, communication functionality, video communication functionality, signaling radio bearer (SRB) functionality, and/or other functionality.

In some instances, the wireless device may allocate a third portion 612 of the minimum reserve energy 604 to at least one of the first wireless communication connection/radio or the second wireless communication connection/radio based at least in part on the energy efficiencies of the first and second wireless communication connections/radios. In this regard, if a first energy efficiency of the first wireless communication connection is greater than (i.e., more energy efficient) a second energy efficiency of the second wireless communication connection, then the wireless device may allocate more (or all) of the third portion 612 of the minimum reserve energy 604 to the first radio. Likewise, if the second energy efficiency of the second wireless communication connection is greater than (i.e., more energy efficient) the first energy efficiency of the first wireless communication connection, then the wireless device may allocate more (or all) of the third portion 612 of the minimum reserve energy 604 to the second radio.

In some instances, the allocation of the first portion 608 and second portion 610 of the minimum reserve energy 604 may equal (or exceed) the minimum reserve energy 604 such that there is not a third portion 612 of the minimum reserve energy 604 to allocate. In such instances, the UE may not allocate any portion of the minimum reserve energy 604 based on the efficiencies of the wireless connections. However, the UE may allocate an available portion of the excess energy 606 (e.g., all of the excess energy 606 or a remaining portion of the excess energy 606 after addressing any overflow of energy allocation to the wireless communication connections that could not be met based on the minimum reserve energy 604) based on the efficiencies of the wireless connections according to aspects of the present disclosure.

In a dual radio transmit scenario (e.g., LTE or NR inter-band carrier aggregation, dual connectivity, etc.) or other multi-radio transmit scenario, where two or more radios are transmitting simultaneously (e.g., in the same antenna group), the amount of energy allocated to each radio may be based on a portion of the minimum reserve energy 604 allocated to the antenna group and a split ratio (e.g., percentage of energy allocated between the primary and secondary radios). In another dual radio transmit scenario, where two radios are transmitting simultaneously in different antenna groups, the two radios may be allocated at least the respective minimum reserve for the corresponding antenna group. When only one radio is transmitting, the wireless device may allocate at least the entire minimum reserve energy 604 to the transmitting radio.

In some instances, the wireless device may allocate the excess energy 606 to at least one of the first wireless communication connection/radio or the second wireless communication connection/radio based at least in part on the energy efficiencies of the first and second wireless communication connections/radios. In this regard, if a first energy efficiency of the first wireless communication connection is greater (i.e., more energy efficient) than a second energy efficiency of the second wireless communication connection, then the wireless device may allocate more (or all) of the excess energy 606 to the first radio. Likewise, if the second energy efficiency of the second wireless communication connection is greater (i.e., more energy efficient) than the first energy efficiency of the first wireless communication connection, then the wireless device may allocate more (or all) of the excess energy 606 to the second radio.

While the power allocation configuration 600 has been described in the context of two wireless communication connections/radios, a similar approach may be used for any number of connections/radios (e.g., 3, 4, etc.). That is, the minimum reserve energy 604 may be divided among the radios based on one or more functionalities and the remainder (if any) of the minimum reserve energy 604 may be allocated among the radios based, at least in part, on the relative energy efficiency of the respective radios. Similarly, the excess energy 606 may be allocated among the connections/radios based, at least in part, on the relative energy efficiency of the respective radios.

Aspects of the present disclosure provide apparatus and methods for allocating transmit energy among multiple radios that communicate via the same RAT or different RATs. For example, a wireless device may allocate a minimum reserve energy among radios in an antenna group. In some cases, the radios in the antenna group may communicate via WWAN (e.g., LTE and 5G NR) and WLAN access technologies (e.g., IEEE 802.11). The wireless device may allocate the minimum reserve energy among the radios that will be actively transmitting at the same time. In some cases, the wireless device may be configured with a minimum reserve energy dedicated to one or more particular RATs (e.g., Bluetooth), where other radios in the antenna group may share a minimum reserve, as further described herein.

Figure 7:
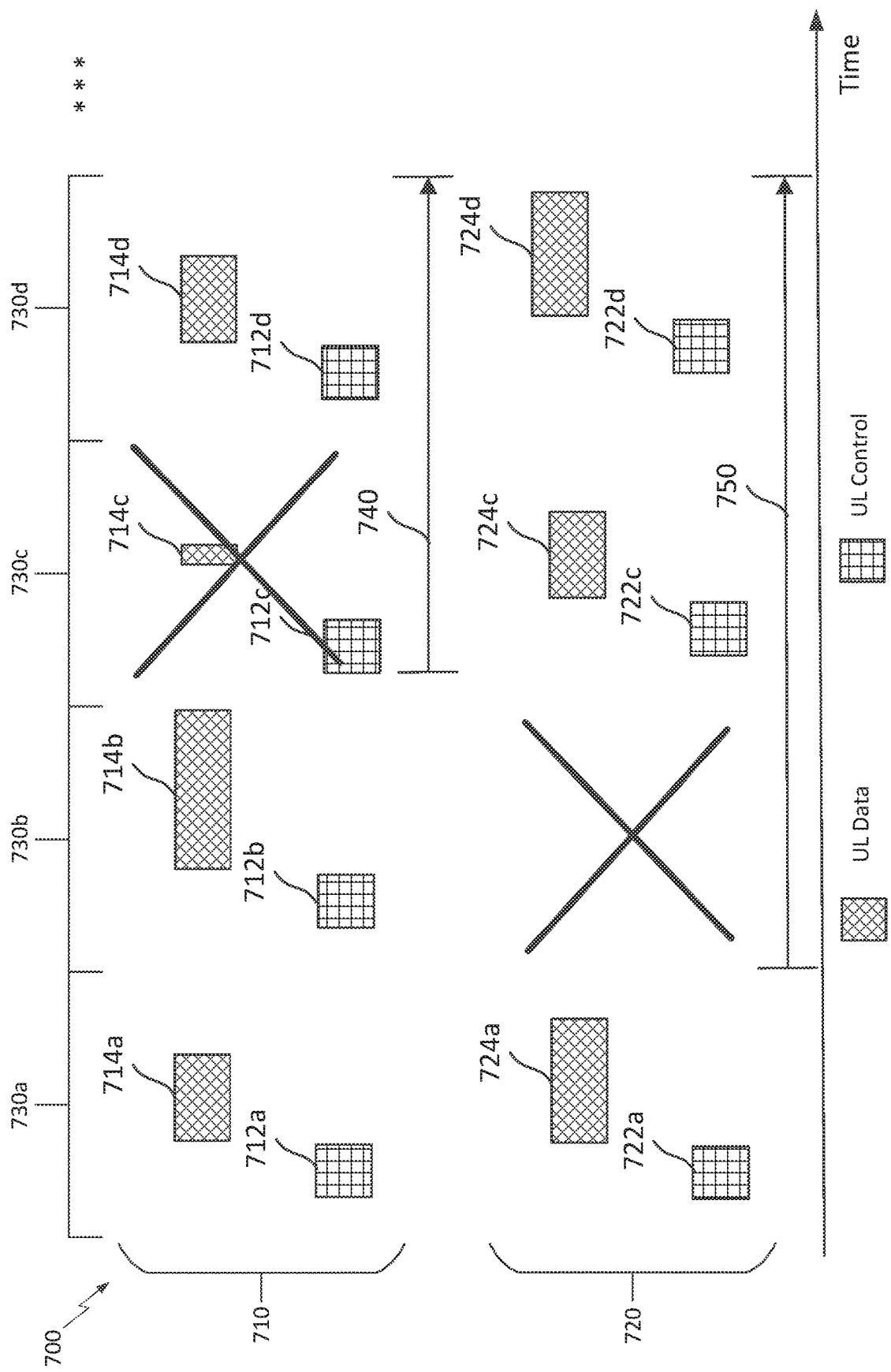
FIG. 7 illustrates an energy monitoring scheme 700 for power allocation based, at least in part, on transmission schedules of wireless communication connections according to some aspects of the present disclosure.

FIG. 7 illustrates an energy monitoring scheme 700 for power allocation based, at least in part, on transmission schedules of wireless communication connections according to some aspects of the present disclosure. In this regard, aspects of the energy monitoring scheme 700 may be utilized in the context of the wireless communication network 100 of FIG. 1 as well as with other aspects of the present disclosure, including the RF exposure limit compliance of FIGS. 4A, 4B, and 4C, antenna groupings of FIG. 5, the power allocation configuration 600 of FIG. 6, the wireless communication method 800 of FIG. 8, and/or the wireless communication method 1000 of FIG. 10.

In some instances, the wireless device (e.g., a UE) may allocate available energy between multiple radios (e.g., a first radio 710 and a second radio 720) for each of a plurality of energy measurement periods 730 (e.g., 730a, 730b, 730c, 730d, etc.). In some aspects, the plurality of energy measurement periods 730 may occur periodically (e.g., every 100 ms, 500 ms, 1000 ms, or other suitable interval). The plurality of energy measurement periods 730 may be contiguous (e.g., occurring back to back or directly adjacent to one another), as shown in FIG. 7, or may be spaced apart from one another in time (e.g., by a fixed interval or gap period).

The wireless device may allocate the available energy (e.g., minimum reserve energy and/or excess energy) for a current transmission occasion and/or a time window associated with a (time-averaged or peak) RF exposure limit based on one or more preceding energy measurement periods 730. For example, for a transmission occasion immediately following energy measurement period 730d, the wireless device may allocate the available energy based on the immediately preceding energy measurement period (e.g., energy measurement period 730d) or an earlier energy measurement period (e.g., energy measurement period 730a, 730b, or 730c). In some instances, the wireless device determines and utilizes energy efficiencies of the radios 710 and 720 based on communications (e.g., physical uplink control channel (PUCCH) communications 712 and 722 and/or physical uplink shared channel (PUSCH) communications 714 and 724) transmitted during the energy measurement periods 730. The determination of the energy efficiencies may be inclusive or exclusive of any padding included in the communications. In some instances, the determination of energy efficiency may be specific to transmissions associated with one or more media access control (MAC) logical channel identities (LCID). For instance, the wireless device may track energy efficiency for voice over NR separately from default bearer transmissions. Further, the techniques described with respect to uplink communications can be applied to downlink communications (e.g., physical downlink control channel (PDCCH) communications and/or physical downlink shared channel (PDSCH) communications) for a wireless device with emission regulatory requirements. In some instances, the wireless device determines and utilizes energy efficiencies of the radios 710 and 720 based on the same energy measurement period 730. In some instances, the common energy measurement period is a current energy measurement period (e.g., the last energy measurement period preceding the transmission occasion).

In some instances, for an initial energy measurement period (e.g., energy measurement period 730a) of the plurality of energy measurement periods 730 the wireless device may allocate the available energy between the radios 710 and 720 based, at least in part, on a default energy allocation and/or an energy allocation statically configured in a file. That is, in some aspects for an energy allocation that occurs before information from the initial energy measurement period is available and/or processed, the wireless device may utilize the default energy allocation. In this regard, the default energy allocation may be an equal split of available energy and/or biased towards one or more of the radios (e.g., based on type of RAT(s), antenna group(s), and/or otherwise). The default energy allocation may be set by a device manufacturer and/or device operator. In some instances, the default energy allocation does not change unless a configuration is modified. In some aspects, energy efficiency may factor in the $P_{limit}$ of the radio. In some aspects, energy efficiency may consider energy per byte transmitted.

In some instances, the wireless device determines and/or utilizes energy efficiencies of the radios based on different energy measurement periods (e.g., a first energy measurement period (e.g., energy measurement period 730d) for the first radio 710 and a second energy measurement period (e.g., energy measurement period 730c) for the second radio 720) to allocate the available energy dynamically. In some instances, the wireless device determines not to utilize a current energy measurement period for determining the energy efficiency of a radio based on one or more factors being present, including but not limited to: no uplink grants associated with the radio during the current energy measurement period; a number of uplink grants associated with the radio during the current energy measurement period not satisfying a threshold; no physical uplink shared channel (PUSCH) communications transmitted by the radio during the current energy measurement period; and/or the associated MAC LCID not transmitting during the current energy measurement period.

For example, the large X through energy measurement period 730b for the second radio 720 indicates that the wireless device determined not to utilize the energy measurement period 730b for the second radio 720. In this regard, the second radio 720 did not have any communications during the energy measurement period 730b (e.g., due to no uplink grants, no PUSCH communications in buffer, an antenna associated with the second radio 720 being used for a different radio, and/or a handover occurring). Accordingly, the wireless device may utilize the measurement period 730b for the first radio 710. That is, the wireless device may update the energy efficiency of the first radio 710 based on the measurement period 730b, but not update the energy efficiency of the second radio 720 based on the measurement period 730b.

As another example, the large X through energy measurement period 730c for the first radio 710 indicates that the wireless device determined not to utilize the energy measurement period 730c for the first radio 710. In this regard, the first radio 710 had both PUCCH and PUSCH communications during the energy measurement period 730c, but the wireless device may have determined that the energy measurement period 730c was not suitable due to an insufficient number of uplink grants/communications (e.g., PUSCH communication 714c did not meet a threshold size) and/or an antenna associated with the first radio 710 being used for a different radio during the energy measurement period 730c. Accordingly, the wireless device may utilize the measurement period 730c for the second radio 720. That is, the wireless device may update the energy efficiency of the second radio 720 based on the measurement period 730c, but not update the energy efficiency of the first radio 710 based on the measurement period 730c.

In some instances, the wireless device may continue to use the energy efficiency from the previous energy measurement period until a time period expires. In this regard, the time period for using the energy efficiency from the previous energy measurement period may be based on at least one of a time correlation associated with the radio (e.g., which may be based on the mobility of the UE and/or the strength of the connection for the radio) or a predetermined amount of time. For example, as shown, the first radio 710 may have a time period 740 during which the wireless device may continue to use a previous energy measurement period (e.g., energy measurement period 730b) in response to determining not to use energy measurement period 730c. Similarly, the second radio 720 may have a time period 750 during which the wireless device may continue to use a previous energy measurement period (e.g., energy measurement period 730a) in response to determining not to use energy measurement period 730b. When the time period 740 and/or the time period 750 expires, after a handover of a serving cell (primary or secondary), and/or when the composition of activated/deactivated secondary serving cells is modified, then the wireless device may utilize a default energy allocation until an energy measurement period occurs that is suitable to use as indicator of the efficiency of the first and second radios 710 and 720 or may utilize an estimated energy efficiency metric for one or more of the radios (e.g., based on SNR, SINR, path loss, etc.) while using the actual energy efficiency of one or more other radios to perform the energy allocation.

Figure 8:
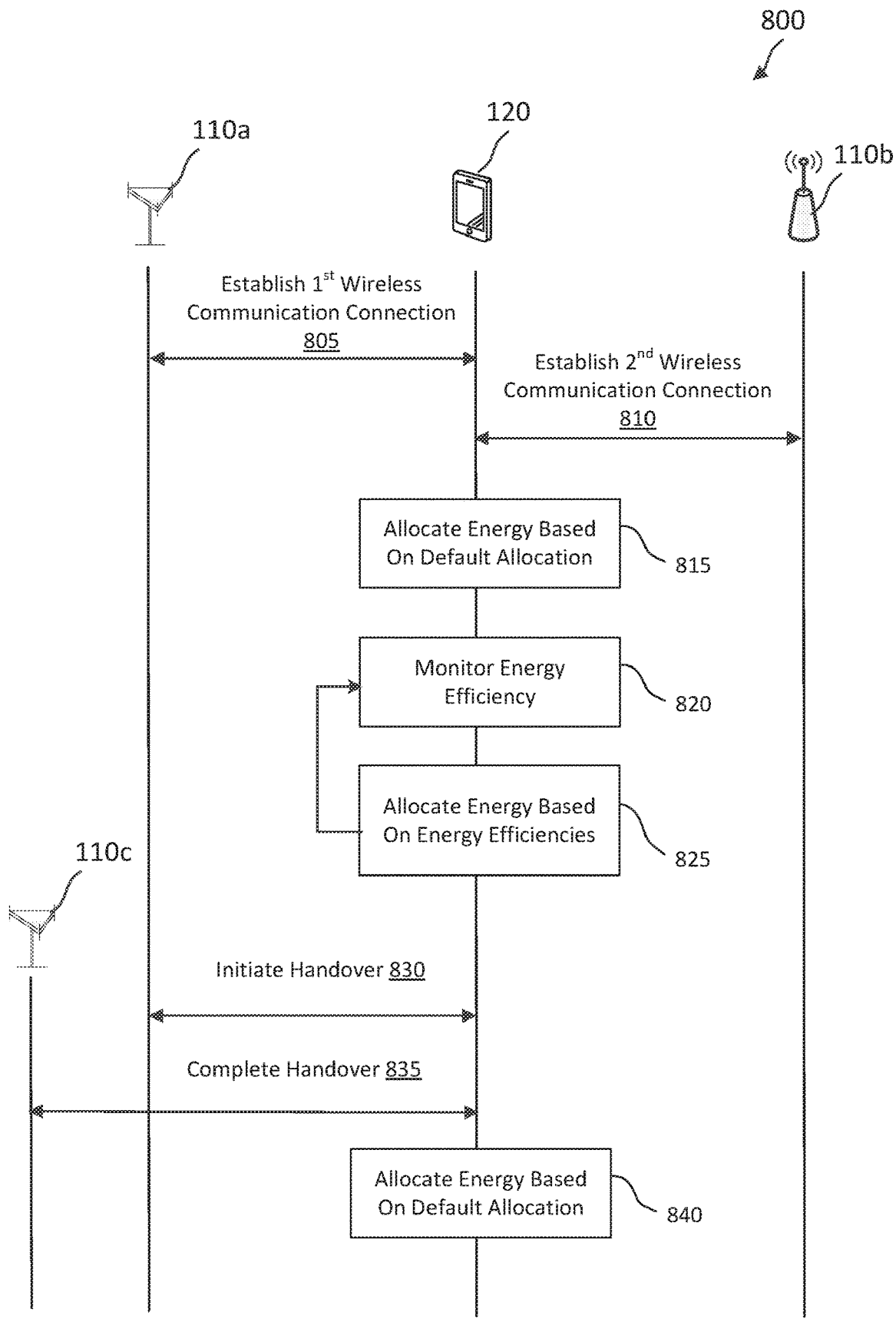
FIG. 8 illustrates a signaling diagram of a wireless communication method 800 according to some aspects of the present disclosure.

FIG. 8 illustrates a signaling diagram of a wireless communication method 800 according to some aspects of the present disclosure. In this regard, aspects of the wireless communication method 800 may be utilized in the context of the wireless communication network 100 of FIG. 1 as well as with other aspects of the present disclosure, including the RF exposure limit compliance of FIGS. 4A, 4B, and 4C, antenna groupings of FIG. 5, the power allocation configuration 600 of FIG. 6, the energy monitoring scheme 700 of FIG. 7, and/or the wireless communication method 1000 of FIG. 10.

At action, 805, a UE 120 establishes a first wireless communication connection with a first wireless device (e.g., BS 110a). The first wireless communication connection may be associated with a first radio. The first radio may be associated with a first antenna group. The first radio may be associated with a first SIM. The first wireless communication connection may be associated with a wireless wide area network (WWAN) (e.g., Long Term Evolution (LTE) or Fifth Generation New Radio (5G NR)), including a WWAN primary serving cell (PCC) and/or a WWAN secondary serving cell(s) (SCC), Bluetooth, IEEE 802.11 (e.g., WiFi), satellite communications, device-to-device (e.g., sidelink) communications, vehicle-to-everything (V2X) communications, etc.

At action, 810, the UE 120 establishes a second wireless communication connection with a second wireless device (e.g., BS 110b). The second wireless communication connection may be associated with a second radio. The second radio may be associated with the first antenna group (i.e., the same antenna group as the first radio) or a second antenna group (e.g., a different antenna group than the first radio). The first radio may be associated with a first SIM (i.e., the same SIM as the first radio) or a second SIM (e.g., a different SIM than the first radio). The second wireless communication connection may be associated with a wireless wide area network (WWAN) (e.g., Long Term Evolution (LTE) or Fifth Generation New Radio (5G NR), copy Bluetooth, IEEE 802.11 (e.g., WiFi), satellite communications, device-to-device (e.g., sidelink) communications, vehicle-to-everything (V2X) communications, etc.

At action 815, the UE 120 allocates an available energy to the first and second radios based on a default energy allocation. The default energy allocation may include allocating energy to the first and second radios to facilitate the associated functionalities of the first and second radios (e.g., essential functionalities of each radio) and allocating any remaining available energy based on an equal split and/or biased towards the first radio or the second radio (e.g., based on type of RAT(s), antenna group(s), and/or otherwise). The default energy allocation may be set by a device manufacturer and/or device operator.

At action 820, the UE monitors the energy efficiency of the first and second radios. In some instances, the UE monitors the energy efficiency during a plurality energy measurement periods (see, e.g., energy measurement periods 730). In this regard, the UE may determine and/or evaluate the energy efficiency of the first and second radios based on one or more of: the amount of energy required to transmit a certain amount of data (e.g., energy per byte) over the radio during a time period (e.g., during an energy measurement period), a power compliance limit (e.g., $P_{max}$, $P_{limit}$, etc.) associated with the radio, a path loss associated with the radio, a throughput associated with the radio, a bandwidth associated with the radio, an amount of unutilized energy associated with the radio, oversteering of energy to one radio to the detriment of another radio, and/or other power usage and/or data transmission parameters.

At action 825, the UE 120 allocates an available energy for a transmission occasion to the first and second radios based, at least in part, on the energy efficiencies of the first and second radios. In some aspects, the energy allocation at action 825 may include allocating energy to the first and second radios to facilitate the associated functionalities of the first and second radios (e.g., essential functionalities of each radio) and allocating any remaining available energy (e.g., which may be used to serve elastic traffic) based on the energy efficiencies of the first and second radios.

In some instances, the UE may determine to steer energy between the first and second radios because either of the first and second radios can contribute to serving elastic traffic flows. For instance, the radios may form a NR PDCP split bearer, the radios may be part of the same NR MAC with one radio serving PCC and the other serving SCC, or one radio serves Sub1 (e.g., associated with a first SIM) and the other radio serves Sub2 (e.g., associated with a second SIM) and the UE determines both subs have internet service active. If the determines that only one of the first and second radios can contribute to serving elastic traffic flows, then the UE may direct all the available steerable energy to the radio having elastic traffic. In some instances, the UE may adjust the amount of energy allocated to the first and second radios in an effort to equalize the energy efficiency of the radios. That is, the UE may allocate energy between the first and second radios in an effort to minimize a difference between the energy efficiencies of the first and second radios.

As shown, the UE may iteratively monitor the energy efficiencies (e.g., the energy consumed during the duty cycle) of the first and second radios, at action 820, and allocate the available energy based on the energy efficiencies, at action 825.

In some aspects, the UE may detect oversteering at action 820. Excessive steering of power away from one radio and to another radio may be referred to as oversteering. In this regard, steering too much energy away from a more inefficient radio to a more efficient radio can result in adverse effects, including failure of the connection associated with the more inefficient radio. For example, if the more inefficient radio is near a cell-edge with an uplink SNR (or other channel condition parameter (SINR, path loss, etc.)) close to a lowest supported value (e.g., for the (MCS, RB) combination in use), steering energy further away from the more inefficient radio may result in the network unit dropping the radio connection (due to UL block error rate (BLER) exceeding a threshold, leading to HARQ failure, and eventually radio link failure (RLF)). The issue may be exacerbated if the primary component carrier (e.g., in a carrier aggregation scenario) or the master cell group (e.g., in dual connectivity scenario) is dropped as a result of oversteering because all of the component carriers and/or all of the cell groups may be dropped as a consequence.

The UE may detect oversteering at action 820 in several ways, including monitoring HARQ BLER, monitoring the number of bytes a UE has sufficient energy to transmit during a time period, monitoring an allocated energy per byte, monitoring RLC retransmission(s), monitoring RLF, monitoring UL pathloss, and/or combinations thereof. In this regard, the UE may monitor one or more of these parameters periodically to detect oversteering. In some instances, the UE may periodically monitor one or more the parameters during a time period (e.g., during an energy measurement period).

In some instances, the UE may monitor HARQ BLER and if the HARQ BLER meets and/or exceeds a threshold (e.g., 5%, 10%, or otherwise), then the UE may determine that oversteering has occurred. In some instances, the UE may calculate a parameter (e.g., byteLimit) representing the number of bytes the UE can transmit over a time period and compare it to a corresponding threshold (e.g., byteLimit-Threshold). In this regard, the byteLimit or number of bytes the UE can transmit over a time period (e.g., next T ms (nominal value=500 ms, 1000 ms, or otherwise)) may be based on the energy allocated to the radio and the energy per byte for the radio (which can be a measure or indication of UL quality). The byteLimitThreshold may be based on one or more of an uplink duty cycle (e.g., RRC ULDC), a subcarrier spacing, a number of resource blocks (e.g., a minimum number of resource blocks associated with a (MCS, RB) combination (nRB_min)), a spectral efficiency (e.g., minimum spectral efficiency for an MCS (SPEF-F_min)), a time period (e.g., an energy measurement period, 500 ms, 1000 ms, or otherwise), one or more fixed variables, one or more other parameters, and/or combinations thereof. If the byteLimit or number of bytes the UE can transmit over the time period is less than the byteLimitThreshold, then the UE may determine that oversteering has occurred. In some instances, the UE may calculate the amount of energy per byte utilized by a radio and if the energy per byte meets and/or exceeds a threshold, then the UE may determine that oversteering has occurred. In this regard, when oversteering has occurred and/or the BLER is high, a UE may use a lot of energy to transmit bytes that are not successfully received. As a result, in such instances the energy per byte may exceed the threshold.

In some instances, the UE may monitor UL pathloss and if the UL pathloss meets and/or exceeds a threshold (e.g., PL_threshold), then the UE may determine that oversteering has occurred. In some instances, the UE may monitor RLC retransmissions and if the number of RLC retransmissions (e.g., for the same RLC sequence number (SN)) meets and/or exceeds a threshold (e.g., 1, 2, 3, etc.), then the UE may determine that oversteering has occurred. In some instances, the UE may monitor RLC retransmissions and if the number of RLC retransmissions meets and/or exceeds a threshold associated with radio link failure (e.g., maxRL-CreTx), then the UE may determine that oversteering has occurred.

Upon detecting oversteering at action 820, the UE may reallocate the available energy between the radios at action 825. In this regard, in response to detecting oversteering the UE may reallocate the available energy at action 820 in several ways, including returning to the default allocation of action 815, returning to a prior energy allocation that did not result in detecting oversteering, returning to the last energy allocation prior to detecting oversteering, steering a preset amount of energy back to the more inefficient radio, or otherwise. In some instances, the UE may keep a log of energy allocations that result in detecting oversteering and/or energy allocations that do not result in detecting oversteering. In this regard, the UE may keep a log for each radio, each (MCS, RB) combination associated with a radio, radio combinations, and/or radio combinations with (MCS, RB). The UE may use the log to identify energy allocations that should be avoided in some instances at action 825 (e.g., energy allocations that previously resulted in oversteering) and/or energy allocations that should be considered for use in some instances (e.g., energy allocations that did not previously result in oversteering). The UE may update the log over time.

In some aspects, at action 820, the UE detects an amount of unutilized energy associated with a radio. In this regard, if the UE has steered available energy to a radio but the radio is not utilizing (or is unable to use) all of the allocated energy or at least a threshold amount of the allocated energy (e.g., 75%, 80%, 90%, 100%, or otherwise), then the UE may reallocate the available energy such that less energy is allocated to the radio.

In some instances, the UE may determine that both radios are not utilizing all or at least a threshold amount of the allocated energy. In such instances, the UE may reallocate the available energy between the radios. In this regard, the UE may reallocate the available energy back towards the default allocation and/or an even allocation. In some instances, the UE may reallocate the available energy in a stepwise fashion (e.g., step A) at each iteration of action 825 and/or periodically (e.g., following each energy measurement period). In this regard, the UE may reallocate towards the default allocation and/or an even allocation until the UE determines that one and/or both radios are utilizing all or at least a threshold amount (e.g., 50%, 60%, 75%, 80%, 90%, 100%, or otherwise) of the energy allocated to the radio. In some instances, the UE may take no action in response to determining that both radios are not utilizing all or at least a threshold amount of the allocated energy. For example, both radios may have unutilized energy as a result of a lack of data to transmit, but the efficiencies of the radios remain the same or approximately the same. In such instances or other instances, the UE may not reallocate the available energy between the radios after determining that both radios are not utilizing all or at least a threshold amount of the allocated energy.

Similarly, in some instances the UE may determine that one of the radios is not utilizing all or at least a threshold amount of the allocated energy. In such instances, the UE may reallocate the available energy between the radios. In this regard, the UE may reallocate the available energy such that the radio not utilizing the energy allocated to it is allocated less energy. In some instances, this may include reallocating the energy between the radios back towards the default allocation and/or an even allocation. In some instances, the UE may reallocate the available energy in a stepwise fashion (e.g., step A) at each iteration of action 825 and/or periodically (e.g., following each energy measurement period). In this regard, the UE may reallocate the energy until the UE determines that the radio that was not utilizing its allocated energy is utilizing all or at least a threshold amount (e.g., 50%, 60%, 75%, 80%, 90%, 100%, or otherwise) of the energy allocated to the radio.

In some instances, once a UE has detected oversteering at action 820, the UE may modify one or more threshold values. For example, if oversteering has been detected previously, the UE may raise or lower a threshold value associated with a monitored parameter (e.g., an energy per byte during an energy measurement period, a power compliance limit, a path loss, a throughput, a bandwidth, an amount of unutilized energy, HARQ BLER, the number of bytes a UE has sufficient energy to transmit during a time period, an allocated energy per byte, RLC retransmission(s), RLF(s), etc.). In some instances, the UE may modify the threshold value (e.g., raise or lower) such that an indication of oversteering may be detected earlier than with the previous threshold value. In this regard, if an indication of oversteering is detected when using the modified threshold value, then the UE may stop the energy steering between the radios at the current energy allocation. In this manner, the modified threshold may allow the UE to identify that oversteering is occurring earlier than with the original threshold value(s). In some instances, after implementing the modified threshold value(s) the UE may resume energy steering and/or return to the original threshold value(s) once the relative efficiency of the two radios changes (e.g., the more inefficient radio becomes the more efficient radio) and/or after a preset time limit.

In some instances, upon detecting oversteering at action 820, the UE may pause energy steering and/or begin buffer status report (BSR) management (e.g., report an UL buffer size as 0). In this regard, the UE may use BSR management in an effort to at least temporarily (e.g., for a predetermined amount of time, a fixed time period, or otherwise) have the network unit stop giving the UE UL grant(s) for at least the more inefficient radio. Using BSR management in this manner may help the UE preserve energy on inefficient radio so that the UE can successfully transmit UL data without multiple HARQ retransmissions when the accumulated energy is sufficient to satisfy the UL budget.

At action 830, a handover is initiated between the UE 120 and the BS 110*a* to transition the UE 120 to BS 110*c*.

At action 835, the handover of the UE to network unit 110*c* is completed.

At action 840, the UE the UE 120 allocates an available energy to the first and second radios based on a default energy allocation (e.g., similar to action 815). In this regard, in some instances the UE may return to using the default energy allocation whenever one of the active radios performs a handover and/or establishes a connection with a new/different wireless device. After action 840, the UE may monitor the energy efficiencies of the first and second radios (e.g., similar to action 820) and allocate the available energy based, at least in part, on the energy efficiencies (e.g., similar to action 825).

Figure 9:
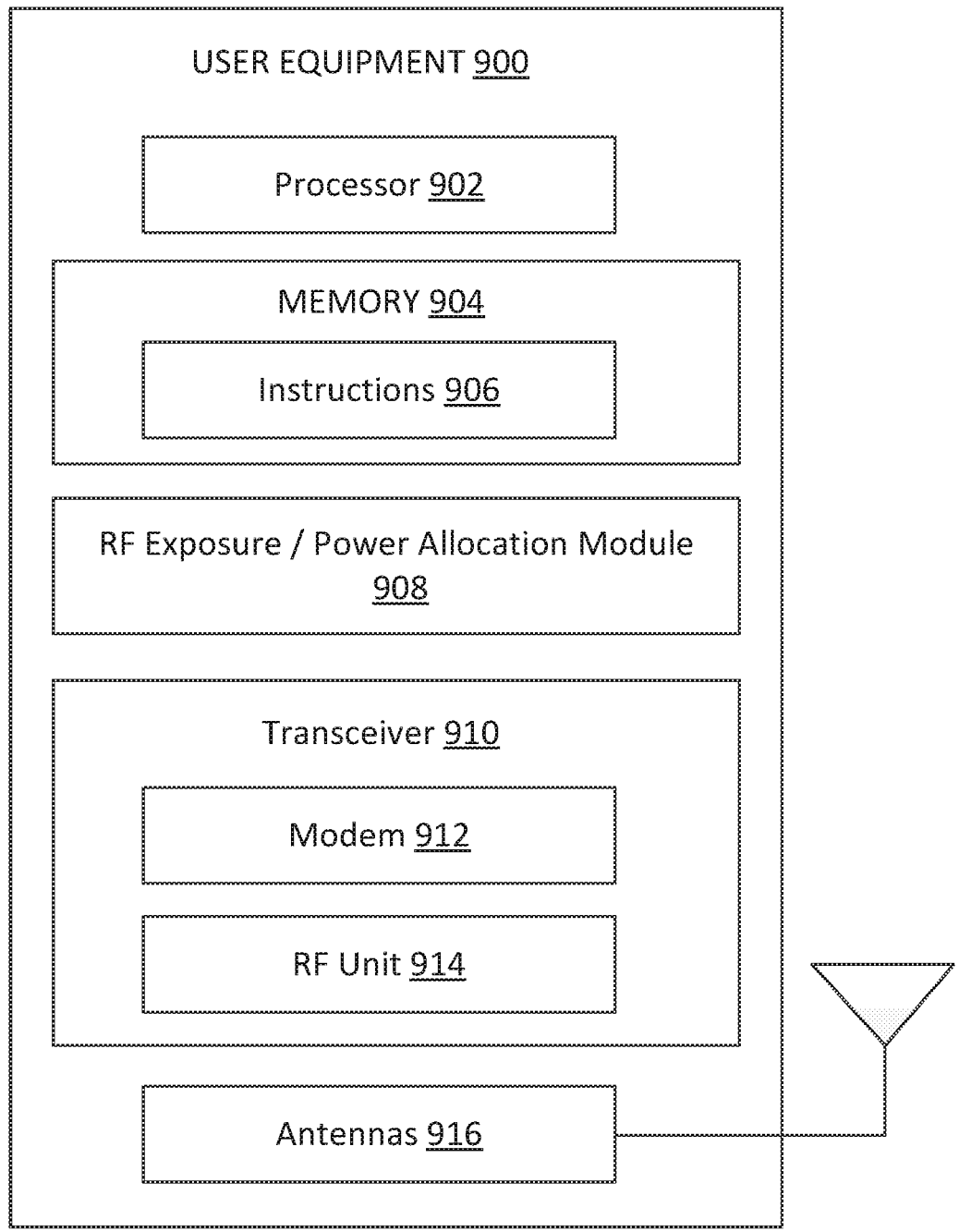
FIG. 9 is a block diagram of a user equipment (UE) according to some aspects of the present disclosure.

FIG. 9 is a block diagram of a user equipment (UE) 900 according to some aspects of the present disclosure. The UE 900 may be, for instance, a UE 115 as discussed in FIGS. 1-7. As shown, the UE 900 may include a processor 902, a memory 904, an RF exposure and power allocation module 808, a transceiver 910 including a modem subsystem 912 and an RF unit 914, and one or more antennas 916. These elements may be coupled with one another. The term "coupled" may refer to directly or indirectly coupled or connected to one or more intervening elements. For instance, these elements may be in direct or indirect communication with each other, for instance via one or more buses.

The processor 902 may include a CPU, a DSP, an ASIC, a controller, a FPGA device, another hardware device, a firmware device, or any combination thereof configured to perform the operations described herein. The processor 902 may also be implemented as a combination of computing devices, e.g., a combination of a DSP and a microprocessor, a plurality of microprocessors, one or more microprocessors in conjunction with a DSP core, or any other such configuration.

The memory 904 may include a cache memory (e.g., a cache memory of the processor 902), RAM, MRAM, ROM, PROM, EPROM, EEPROM, flash memory, solid state memory device, hard disk drives, other forms of volatile and non-volatile memory, or a combination of different types of memory. In an aspect, the memory 904 includes a non-transitory computer-readable medium. The memory 904 may store, or have recorded thereon, instructions 906. The instructions 906 may include instructions that, when executed by the processor 902, cause the processor 902 to perform the operations described herein with reference to a UE 115 in connection with aspects of the present disclosure, for instance, aspects of FIGS. 4-8 and 10. Instructions 906 may also be referred to as program code. The program code may be for causing a wireless communication device to perform these operations, for instance by causing one or more processors (such as processor 902) to control or command the UE 900 to do so. The terms "instructions" and "code" should be interpreted broadly to include any type of computer-readable statement(s). For instance, the terms "instructions" and "code" may refer to one or more programs, routines, sub-routines, functions, procedures, etc. "Instructions" and "code" may include a single computer-readable statement or many computer-readable statements.

The RF exposure and power allocation module 908 may be implemented via hardware, software, or combinations thereof. For instance, the RF exposure and power allocation module 908 may be implemented as a processor, circuit, and/or instructions 906 stored in the memory 904 and executed by the processor 902. In some aspects, the RF exposure and power allocation module 908 can be integrated within the modem subsystem 912. For instance, the RF exposure and power allocation module 908 can be implemented by a combination of software components (e.g., executed by a DSP or a general processor) and hardware components (e.g., logic gates and circuitry) within the modem subsystem 912. The RF exposure and power allocation module 908 may communicate with one or more components of the UE 900 to implement various aspects of the present disclosure, for instance, aspects of FIGS. 4-8 and 10. In some aspects, the RF exposure and power allocation module 908 may include the RF exposure manager 122 and/or associated functionality.

In some aspects, the RF exposure and power allocation module 908 may be configured, along with other components of the UE 900, to allocate an available energy between a first wireless communication connection and a second wireless communication connection by: allocating a first portion of the available energy to the first wireless communication connection based at least in part on one or more functionalities associated with the first wireless communication connection; allocating a second portion of the available energy to the second wireless communication connection based at least in part on one or more functionalities associated with the second wireless communication connection; and allocating a third portion of the available energy to at least one of the first wireless communication connection or the second wireless communication connection based at least in part on a first energy efficiency of the first wireless communication connection and a second energy efficiency of the second wireless communication connection. In some aspects, the RF exposure and power allocation module 908 may be configured, along with other components of the UE 900, to allocate an available energy between the first wireless communication connection and the second wireless communication connection for each of a plurality of energy measurement periods.

In some aspects, the RF exposure and power allocation module 908 may be configured, along with other components of the UE 900, to determine the energy efficiency of one or more wireless communication connections based on the amount of energy required to transmit a certain amount of data (e.g., energy per byte) over the wireless communication connection during a time period (e.g., during an energy measurement period), a power compliance limit (e.g., $P_{max}$, $P_{limit}$, etc.) associated with the wireless communication connection, a path loss associated with a wireless communication connection, a throughput associated with the wireless communication connection, a bandwidth associated with the wireless communication connection, an amount of unutilized energy associated with the wireless communication connection, oversteering of energy to one wireless communication connection to the detriment of another wireless communication connection, and/or other power usage and/or data transmission parameters.

As shown, the transceiver 910 may include the modem subsystem 912 and the RF unit 914. The transceiver 910 can be configured to communicate bi-directionally with other devices, such as the BSs 105 and/or network units. The modem subsystem 912 may be configured to modulate and/or encode the data from the memory 904 and/or the RF exposure and power allocation module 908 according to a MCS, e.g., a LDPC coding scheme, a turbo coding scheme, a convolutional coding scheme, a digital beamforming scheme, etc. The RF unit 914 may be configured to process (e.g., perform analog to digital conversion or digital to analog conversion, etc.) modulated/encoded data (e.g., communication signals, data signals, control signals, etc.) from the modem subsystem 912 (on outbound transmissions). The RF unit 914 may be further configured to perform analog beamforming in conjunction with the digital beamforming. Although shown as integrated together in transceiver 910, the modem subsystem 912 and the RF unit 914 may be separate devices that are coupled together at the UE 900 to enable the UE 900 to communicate with other devices.

The RF unit 914 may provide the modulated and/or processed data, e.g., data packets (or, more generally, data messages that may contain one or more data packets and other information), to the antennas 916 for transmission to one or more other devices. The antennas 916 may further receive data messages transmitted from other devices. The antennas 916 may provide the received data messages for processing and/or demodulation at the transceiver 910. The transceiver 910 may provide the demodulated and decoded data (e.g., communication signals, data signals, control signals, etc.) to the RF exposure and power allocation module 908 for processing. The antennas 916 may include multiple antennas of similar or different designs in order to sustain multiple transmission links.

Figure 10:
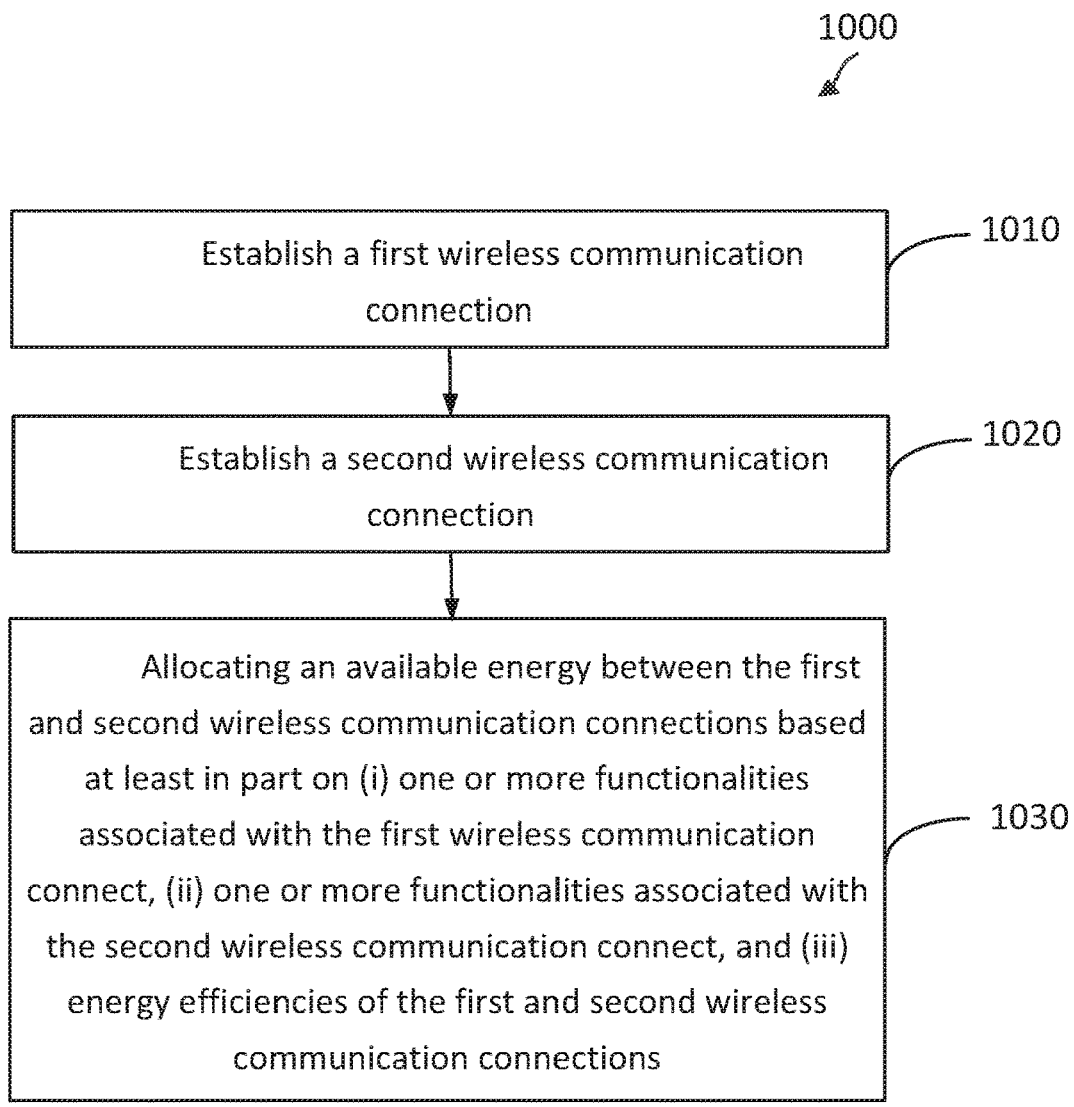
FIG. 10 illustrates a flow diagram of a wireless communication method 1000 according to some aspects of the present disclosure.

FIG. 10 illustrates a flow diagram of a wireless communication method according to some aspects of the present disclosure. Aspects of the method 1000 can be executed by a computing device (e.g., a processor, processing circuit, and/or other suitable component) of a wireless communication device or other suitable means for performing the blocks. For instance, the wireless communication device may be a UE (e.g., UE 120 or UE 900). The UE may utilize one or more components, such as the processor 902, the memory 904, the RF exposure and power allocation module 908, the transceiver 910, the modem subsystem 912, the RF unit 914, and/or the one or more antennas 916, to execute the blocks of method 1000. The method 1000 may employ similar mechanisms as described in FIGS. 4-8. As illustrated, the method 1000 includes a number of enumerated blocks, but aspects of the method 1000 may include additional blocks before, after, and in between the enumerated blocks. In some aspects, one or more of the enumerated blocks may be omitted or performed in a different order.

At block 1010, the UE (e.g., UE 120 or UE 900) establishes a first wireless communication connection. The first wireless communication connection may be associated with a wireless wide area network (WWAN) (e.g., Long Term Evolution (LTE) or Fifth Generation New Radio (5G NR)), Bluetooth, IEEE 802.11 (e.g., WiFi), satellite communications, device-to-device (e.g., sidelink) communications, vehicle-to-everything (V2X) communications, etc. The first wireless communication connection may be with a network unit (e.g., BS 110, central unit (CU), distributed unit (DU), radio unit (RU), etc.) and/or another UE.

At block 1020, the UE establishes a second wireless communication connection. The second wireless communication connection may be associated with a wireless wide area network (WWAN) (e.g., Long Term Evolution (LTE) or Fifth Generation New Radio (5G NR)), Bluetooth, IEEE 802.11 (e.g., WiFi), satellite communications, device-to-device (e.g., sidelink) communications, vehicle-to-everything (V2X) communications, etc. The second wireless communication connection may be with a network unit (e.g., BS 110, central unit (CU), distributed unit (DU), radio unit (RU), etc.) and/or another UE.

In some instances, the first wireless communication connection (established at block 1010) is associated with a first radio access technology (RAT) and the second wireless communication connection (established at block 1020) is associated with a second RAT different than the first RAT. In this regard, in some aspects the UE may operate in a dual connectivity mode with the first wireless communication connection and the second wireless communication connection. In some instances, the first wireless communication connection and the second wireless communication connection are associated with the same RAT. In this regard, in some aspects the UE operates in a carrier aggregation mode with the first wireless communication connection and the second wireless communication connection.

In some instances, the first wireless communication connection is associated with a first subscriber identity module (SIM) and the second wireless communication connection is associated with a second SIM different than the first SIM. In this regard, one or more radios associated with the first SIM may be mapped to the same antenna group as one or more radios associated with the second SIM. As a result, one or more radios associated with the first SIM may share an energy budget with one or more radios associated with the second SIM. In some instances, allocating power between the wireless communication connections associated with the first and second SIMs based, at least in part, on the efficiencies of the wireless communication connections can help maximize overall capacity across the two associated subscriptions. Furthermore, in some instances, the energy efficiencies of and/or the energy allocations across the wireless communication connections associated with the SIMs may be provided to one or more upper layer components and/or operations of the UE. The upper layer component(s) and/or operations may utilize the information regarding the energy efficiencies and/or the energy allocations to allocate application traffic across the SIMs appropriately such that overall capacity of the UE is maximized.

At block 1030, the UE allocates an available energy between the first wireless communication connection and the second wireless communication connection. The available energy allocated by the UE may include a minimum reserve energy (see, e.g., minimum reserve energy 604 of FIG. 6) and/or an excess energy (see, e.g., excess energy 606 of FIG. 6) associated with a transmission occasion and/or a time window associated with a (time-averaged or peak) RF exposure limit. In some aspects, the available energy is a total available energy (see, e.g., total available energy 602 of FIG. 6) for a transmission occasion and/or a time window associated with a (time-averaged or peak) RF exposure limit. The total available energy may be the total amount of energy available to be allocated to one or more radios for a certain duration (e.g., a transmission occasion or a time window associated with a (time-averaged or peak) RF exposure limit). The minimum reserve energy may refer to a minimum level of transmit power allocated to one or more radios for a certain duration (e.g., a transmission occasion or a time window associated with a (time-averaged or peak) RF exposure limit).

At block 1030, the UE may allocate a first portion of the available energy to the first wireless communication connection based at least in part on one or more functionalities associated with the first wireless communication connection. The first portion of the available energy (see, e.g., first portion 608 of FIG. 6) may be the amount of energy needed for the first wireless communication connection to perform the one or more functionalities. In this regard, the functionalities may include control channel functionality, random access channel functionality, voice, communication functionality, video communication functionality, signaling radio bearer (SRB) functionality, and/or other functionality.

At block 1030, the UE may allocate a second portion of the available energy to the second wireless communication connection based at least in part on one or more functionalities associated with the second wireless communication connection. The second portion of the available energy (see, e.g., second portion 610 of FIG. 6) may be the amount of energy needed for the second wireless communication connection to perform the one or more functionalities. In this regard, the functionalities may include control channel functionality, random access channel functionality, voice, communication functionality, video communication functionality, signaling radio bearer (SRB) functionality, and/or other functionality.

At block 1030, the UE may allocate a third portion (see, e.g., third portion 612 and/or excess energy 606 of FIG. 6) of the available energy to at least one of the first wireless communication connection or the second wireless communication connection based at least in part on energy efficiencies of the first and second wireless communication connections. The UE may determine and/or evaluate the energy efficiency of each wireless communication connection. Energy efficiency may refer to one or more parameters and/or calculations indicative, either directly or indirectly, of an amount of energy utilized by a device to transmit an amount of data. The UE may determine and/or evaluate the energy efficiency based on one or more of: the amount of energy required to transmit a certain amount of data (e.g., energy per byte) over the wireless communication connection during a time period (e.g., during an energy measurement period), a power compliance limit (e.g., $P_{max}$, $P_{limit}$, etc.) associated with the wireless communication connection, a path loss associated with the wireless communication connection, a throughput associated with the wireless communication connection, a bandwidth associated with the wireless communication connection, an amount of unutilized energy associated with the wireless communication connection, oversteering of energy to a wireless communication connection and away from another wireless communication connection, and/or other power usage and/or data transmission parameters. In some instances, the amount of unutilized energy associated with a wireless communication connection may provide an indication that the wireless communication connection cannot fully utilize the allocated energy (e.g., due to lack of grants and/or traffic) and, therefore, less energy should be allocated to the wireless communication connection.

In some instances, the energy efficiency of a wireless communication connection may be based on the energy used to transmit one or more communications over the wireless communication connection during an energy measurement period. In some aspects, the energy efficiency of a wireless communication connection may be based on the energy per byte used to transmit one or more communications over the wireless communication connection during an energy measurement period. In some aspects, the energy efficiency of a wireless communication connection may be based on a ratio of a power compliance limit (e.g., $P_{max}$, $P_{limit}$, etc.) during an energy measurement period to the energy per byte used to transmit the one or more communications over the wireless communication connection during the energy measurement period. In some instances, the one or more communications transmitted over the wireless communication connection during an energy measurement period may include physical uplink shared channel (PUSCH) communications and/or physical uplink control channel (PUCCH) communications. In some instances, only PUSCH communications may be utilized in determining the energy efficiency of the wireless communication connection. In other instances, both PUSCH and PUCCH communications may be utilized in determining the energy efficiency of the wireless communication connection. In some instances, the energy efficiency determination may include any padding bytes associated with the PUSCH and/or PUCCH communications. In some instances, the energy efficiency determination may exclude any padding bytes associated with the PUSCH and/or PUCCH communications.

In some instances, at block 1030, the UE allocates the third portion of the available energy based on a first energy efficiency of the first wireless communication connection and a second energy efficiency of the second wireless communication connection. In this regard, if the first energy efficiency of the first wireless communication connection is greater than (i.e., more energy efficient) a second energy efficiency of the second wireless communication connection, then the UE may allocate more (or all) of the third portion of the available energy to the first wireless communication connection. Likewise, if the second energy efficiency of the second wireless communication connection is greater than (i.e., more energy efficient) the first energy efficiency of the first wireless communication connection, then the UE may allocate more (or all) of the third portion of the available energy to the second wireless communication connection.

In some instances, the UE may adjust the amount of energy allocated to each of the wireless communication connections over time in an effort to equalize the energy efficiency of each of the wireless communication connections. That is, the UE may minimize a difference between the energy efficiencies of the wireless communication connections by adjusting the amount of energy allocated to each wireless communication connection. In this regard, the UE may allocate available energy between the first wireless communication connection and the second wireless communication connection for each of a plurality of energy measurement periods. The plurality of energy measurement periods may occur periodically (e.g., every 100 ms, 500 ms, 1000 ms, or other suitable interval). In this regard, the UE may allocate an available energy for a current transmission occasion and/or a time window associated with a (time-averaged or peak) RF exposure limit based on one or more preceding energy measurement periods (e.g., an immediately preceding energy measurement period or earlier energy measurement period). For example, in some instances the UE determines and utilizes energy efficiencies of the first and second wireless communication connections based on communications transmitted during the same energy measurement period (e.g., a first energy measurement period). In some instances, common energy measurement period is a current energy measurement period (e.g., the last energy measurement period preceding the transmission occasion).

In some instances, the UE determines and/or utilizes energy efficiencies of the first and second wireless communication connections based on different energy measurement periods (e.g., a first energy measurement period for the first wireless communication connection (e.g., a current energy measurement period) and a second energy measurement period for the second wireless communication connection (e.g., a previous energy measurement period occurring prior to the current energy measurement period)). In some instances, the UE determines not to utilize a current energy measurement period for determining the energy efficiency of a wireless communication connection based on one or more factors being present, including but not limited to: the UE not receiving any uplink grants associated with the wireless communication connection during the current energy measurement period; a number of uplink grants for the UE associated with the wireless communication connection during the current energy measurement period not satisfying a threshold; and/or no physical uplink shared channel (PUSCH) communications transmitted by the UE over the wireless communication connection during the current energy measurement period. In some instances, the UE may continue to use the energy efficiency from the previous energy measurement period until a time period expires. In this regard, the time period for using the energy efficiency from the previous energy measurement period may be based on at least one of a time correlation associated with the wireless communication connection (e.g., which may be based on the mobility of the UE and/or the strength of the wireless communication connection) or a predetermined amount of time.

In some instances, for an initial energy measurement period of the plurality of energy measurement periods the UE allocates the available energy between the first wireless communication connection and the second wireless communication connection based, at least in part, on a default energy allocation. In this regard, the default energy allocation may be an equal split of available energy and/or biased (e.g., 55/45, 60/40, 65/35, 70/30, 75/25, etc., or otherwise) towards one of the wireless communication connections (e.g., based on type of RAT(s), antenna group(s), and/or otherwise). The default energy allocation may be set by a device manufacturer and/or device operator.

In certain aspects, the UE may be configured to allocate the available energy among radios that are in an active state.

For example, a radio in an active state may correspond to when the radio is (or could be or will be) actively transmitting in a transmission occasion or time interval of the time window. As an example, if two of three radios of an antenna group are in an active mode, then the UE may allocate the available energy between those two active radios. The portion of the available energy, if any, that is not allocated to the active state radios may be allocated to the non-active radio(s). In some instances, the UE may refrain from allocating any of the available energy to the non-active radio(s).

In some instances, the UE may perform a handover for at least one of the first wireless communication connection or the second wireless communication connection. The UE may allocate the available energy between the first wireless communication connection and the second wireless communication connection for an initial energy measurement period following the handover based, at least in part, on an energy allocation that is different than a last energy allocation prior to the performing the handover. In some instances, the UE may use a default energy allocation following a handover associated with at least one of the wireless communication connections.

In some instances, the UE establishes a third wireless communication connection. In this regard, the UE may allocate the available energy between the first wireless communication connection, the second wireless communication connection, and the third wireless communication connection. The UE may similarly establish further wireless communication connections (e.g., fourth, fifth, etc.) and allocate the available energy across the different wireless communication connections in a similar manner (e.g., based on functionalities and/or energy efficiency of the wireless communication connections).

In some instances, the UE may switch operation of an antenna between a first antenna group and a second antenna group. For example, referring again to FIG. 5, the UE may switch operation of the fourth antenna 502*d* between the antenna group 504 and the antenna group 508 (e.g., from antenna group 504 to antenna group 508 or vice versa). As a result, in some instances the antenna may be operating with a different antenna group during one or more energy measurement periods. Accordingly, in some instances the UE may determine to not utilize a current energy measurement period as an indicator of the efficiency of a wireless communication connection because the antenna is operating with a different antenna group than the antenna group of interest associated with the wireless communication connection/radio. In such instances, the UE may utilize the energy efficiency from a previous energy measurement period (e.g., the most recent energy measurement period where a suitable energy efficiency was determined and the antenna was operating with the antenna group associated with the wireless communication connection). Accordingly, the UE may allocate the available energy between the first wireless communication connection and the second wireless communication connection for an energy measurement period immediately following the switching the operation of the antenna (e.g., when the antenna returns to operating in the antenna group associated with the wireless communication connection) based, at least in part, on energy measurement period occurring prior to the switching the operation of the antenna (e.g., the most recent energy measurement period where a suitable energy efficiency was determined and the antenna was operating with the antenna group associated with the wireless communication connection). The UE may continue to utilize the energy efficiency from the previous energy measurement period until a time period expires (e.g., based on time correlation associated with the wireless communication connection, a predetermined amount of time, a timer, etc.).

In some aspects, the UE may monitor for oversteering in allocating the energy between multiple radios/wireless communication connections. The UE may detect oversteering in several ways, including monitoring HARQ BLER, monitoring an allocated energy per byte, monitoring RLC retransmission(s), monitoring RLF, monitoring UL pathloss, and/or combinations thereof. In this regard, the UE may monitor one or more of these parameters periodically to detect oversteering. In some instances, the UE may periodically monitor one or more the parameters during a time period (e.g., during an energy measurement period).

In some instances, the UE may monitor HARQ BLER and if the HARQ BLER satisfies (e.g., meets and/or exceeds) a threshold (e.g., 5%, 10%, or otherwise), then the UE may determine that oversteering has occurred. In some instances, the UE may calculate a parameter (e.g., byteLimit) representing the number of bytes the UE can transmit over a time period and compare it to a corresponding threshold (e.g., byteLimitThreshold. In this regard, the byteLimit or number of bytes the UE can transmit over a time period (e.g., next T ms (nominal value=500 ms, 1000 ms, or otherwise)) may be based on the energy allocated to the radio and the energy per byte for the radio (which can be a measure or indication of UL quality). The byteLimitThreshold may be based on one or more of an uplink duty cycle (e.g., RRC ULDC), a subcarrier spacing, a number of resource blocks (e.g., a minimum number of resource blocks associated with a (MCS, RB) combination (nRB_min)), a spectral efficiency (e.g., minimum spectral efficiency for an MCS (SPEFF_min)), a time period (e.g., an energy measurement period, 500 ms, 1000 ms, or otherwise), one or more fixed variables, one or more other parameters, and/or combinations thereof. If the byteLimit or number of bytes the UE can transmit over the time period does not satisfy (e.g., less than) the byteLimitThreshold, then the UE may determine that oversteering has occurred. In some instances, the UE may calculate the amount of energy per byte utilized by a radio and if the energy per byte satisfies (e.g., meets and/or exceeds) an energy per byte threshold, then the UE may determine that oversteering has occurred.

In some instances, the UE may monitor UL pathloss and if the UL pathloss satisfies (e.g., meets and/or exceeds) a threshold (e.g., PL_threshold), then the UE may determine that oversteering has occurred. In some instances, the UE may monitor RLC retransmissions and if the number of RLC retransmissions (e.g., for the same RLC sequence number (SN)) satisfies (e.g., meets and/or exceeds) a threshold (e.g., 1, 2, 3, etc.), then the UE may determine that oversteering has occurred. In some instances, the UE may monitor RLC retransmissions and if the number of RLC retransmissions satisfies (e.g., meets and/or exceeds) a threshold associated with radio link failure (e.g., maxRLCreTx), then the UE may determine that oversteering has occurred.

Upon detecting oversteering, the UE may reallocate the available energy between the radios/wireless communication connections. In this regard, in response to detecting oversteering the UE may reallocate the available energy in several ways, including returning to a default allocation, returning to a prior energy allocation that did not result in detecting oversteering, returning to the last energy allocation prior to detecting oversteering, steering a preset amount of energy (e.g., step A) back to the more inefficient radio, or otherwise. In some instances, the UE may keep a log of energy allocations that result in detecting oversteering and/ or energy allocations that do not result in detecting oversteering. In this regard, the UE may keep a log for each radio, each (MCS, RB) combination associated with a radio, radio combinations, and/or radio combinations with (MCS, RB). The UE may use the log to identify energy allocations that should be avoided in some instances (e.g., energy allocations that previously resulted in oversteering) and/or energy allocations that should be considered for use in some instances (e.g., energy allocations that did not previously result in oversteering). The UE may update the log over time.

In some aspects, the UE may detect an amount of unutilized energy associated with a radio. In this regard, if the UE has steered available energy to a radio but the radio is not utilizing (or is unable to use) all of the allocated energy or at least a threshold amount of the allocated energy (e.g., 75%, 80%, 90%, 100%, or otherwise), then the UE may reallocate the available energy such that less energy is allocated to the radio. In some instances, the UE may take no action in response to determining that both radios are not utilizing all or at least a threshold amount of the allocated energy. For example, both radios may have unutilized energy as a result of a lack of data to transmit, but the efficiencies of the radios remain the same or approximately the same. In such instances or other instances, the UE may not reallocate the available energy between the radios after determining that both radios are not utilizing all or at least a threshold amount of the allocated energy.

In some instances, the UE may determine that both radios are not utilizing all or at least a threshold amount of the radio's allocated energy. In such instances, the UE may reallocate the available energy between the radios. In this regard, the UE may reallocate the available energy back towards the default allocation and/or an even allocation. In some instances, the UE may reallocate the available energy in a stepwise fashion (e.g., step A) at each instance of an energy reallocation and/or periodically (e.g., following each energy measurement period). In this regard, the UE may reallocate towards the default allocation and/or the even allocation until the UE determines that one and/or both radios are utilizing all or at least a threshold amount (e.g., 50%, 60%, 75%, 80%, 90%, 100%, or otherwise) of the energy allocated to the radio.

Similarly, in some instances the UE may determine that one of the radios is not utilizing all or at least a threshold amount of the allocated energy. In such instances, the UE may reallocate the available energy between the radios. In this regard, the UE may reallocate the available energy such that the radio not utilizing the energy allocated to it is allocated less energy. In some instances, this may include reallocating the energy between the radios back towards a default allocation and/or an even allocation. In some instances, the UE may reallocate the available energy in a stepwise fashion (e.g., step A) at each instance of an energy reallocation and/or periodically (e.g., following each energy measurement period). In this regard, the UE may reallocate the energy until the UE determines that the radio that was not utilizing its allocated energy is utilizing all or at least a threshold amount (e.g., 50%, 60%, 75%, 80%, 90%, 100%, or otherwise) of the energy allocated to the radio.

In some instances, once a UE has detected oversteering, the UE may modify one or more threshold values. For example, if oversteering has been detected previously, the UE may raise or lower a threshold value associated with a monitored parameter (e.g., an energy per byte during an energy measurement period, a power compliance limit, a path loss, a throughput, a bandwidth, an amount of unutilized energy, HARQ BLER, the number of bytes a UE has sufficient energy to transmit during a time period, an allocated energy per byte, RLC retransmission(s), RLF(s), etc.). In some instances, the UE may modify the threshold value (e.g., raise or lower) such that oversteering may be detected earlier than with the previous threshold value. In this regard, if oversteering is detected when using the modified threshold value, then the UE may stop the energy steering between the radios at the current energy allocation. In this manner, the modified threshold may allow the UE to identify that oversteering is occurring earlier than with the original threshold value(s). In some instances, after implementing the modified threshold value(s) the UE may resume energy steering and/or return to the original threshold value(s) once the relative efficiency of the two radios changes (e.g., the more inefficient radio becomes the more efficient radio) and/or after a preset time limit.

In some instances, upon detecting oversteering, the UE may pause energy steering and/or begin buffer status report (BSR) management (e.g., report an UL buffer size as 0). In this regard, the UE may use BSR management in an effort to at least temporarily (e.g., for a predetermined amount of time, a fixed time period, or otherwise) have the network unit stop giving the UE UL grant(s) for at least the more inefficient radio. Using BSR management in this manner may help the UE preserve energy on inefficient radio so that the UE can successfully transmit UL data without multiple HARQ retransmissions when the accumulated energy is sufficient to satisfy the UL budget.

Example Aspects

Other aspects of the present disclosure include the implementation examples described in the following numbered clauses:

Clause 1. A method of wireless communication performed by a user equipment (UE), the method comprising:
establishing a first wireless communication connection;
establishing a second wireless communication connection; and
allocating an available energy between the first wireless communication connection and the second wireless communication connection by:
allocating a first portion of the available energy to the first wireless communication connection based at least in part on one or more functionalities associated with the first wireless communication connection;
allocating a second portion of the available energy to the second wireless communication connection based at least in part on one or more functionalities associated with the second wireless communication connection; and
allocating a third portion of the available energy to at least one of the first wireless communication connection or the second wireless communication connection based at least in part on a first energy efficiency of the first wireless communication connection and a second energy efficiency of the second wireless communication connection.

Clause 2. The method of clause 1, wherein:
the first energy efficiency of the first wireless communication connection is based on an energy per byte of one or more communications transmitted over the first wireless communication connection; and
the second energy efficiency of the second wireless communication connection is based on an energy per byte of one or more communications transmitted over the second wireless communication connection.

Clause 3. The method of clause 2, wherein:
the first energy efficiency of the first wireless communication connection is based on a first power compliance limit associated with the one or more communications transmitted over the first wireless communication connection; and
the second energy efficiency of the second wireless communication connection is based on a second power compliance limit associated with the one or more communications transmitted over the second wireless communication connection.

Clause 4. The method of clause 3, wherein:
the one or more communications transmitted over the first wireless communication connection that the first energy efficiency is based on at least one of a physical uplink shared channel (PUSCH) communication or a physical uplink control channel (PUCCH) communication; and
the one or more communications transmitted over the second wireless communication connection that the second energy efficiency is based on at least one of a PUSCH communication or a PUCCH communication.

Clause 5. The method of clause 3, wherein:
the one or more communications transmitted over the first wireless communication connection that the first energy efficiency is based on only physical uplink shared channel (PUSCH) communications; and
the one or more communications transmitted over the second wireless communication connection that the second energy efficiency is based on only PUSCH communications.

Clause 6. The method of clause 1, further comprising:
determining the first energy efficiency of the first wireless communication connection; and
determining the second energy efficiency of the second wireless communication connection.

Clause 7. The method of clause 6, wherein the determining the first energy efficiency of the first wireless communication connection comprises:
determining the first energy efficiency of the first wireless communication connection based on one or more communications transmitted over the first wireless communication connection during a first period.

Clause 8. The method of clause 7, wherein the determining the second energy efficiency of the second wireless communication connection comprises:
determining the second energy efficiency of the second wireless communication connection based on one or more communications transmitted over the second wireless communication connection during the first period.

Clause 9. The method of clause 7, wherein the determining the second energy efficiency of the second wireless communication connection comprises:
the second energy efficiency of the second wireless communication connection is based on one or more communications transmitted over the second wireless communication connection during a second period, the second period being different than the first period.

Clause 10. The method of clause 9, wherein the first period is a current energy measurement period and the second period is a previous energy measurement period occurring prior to the current energy measurement period.

Clause 11. The method of clause 10, further comprising:
determining to base the second energy efficiency on the one or more communications transmitted over the second wireless communication connection during the second period instead of the first period based on at least one of:
the UE not receiving any uplink grants associated with the second wireless communication connection during the first period;
a number of uplink grants for the UE associated with the second wireless communication connection during the first period not satisfying a threshold; or
no physical uplink shared channel (PUSCH) communications by the UE during the first period.

Clause 12. The method of clause 11, wherein the determining to base the second energy efficiency on the one or more communications transmitted over the second wireless communication connection during the second period instead of the first period is further based on a time period not expiring.

Clause 13. The method of clause 12, wherein the time period is based on at least one of:
a time correlation associated with the second wireless communication connection; or
a predetermined amount of time.

Clause 14. The method of clause 13, further comprising:
allocating the available energy between the first wireless communication connection and the second wireless communication connection for an energy measurement period of the plurality of energy measurement periods occurring after the time period expire based, at least in part, on a default energy allocation.

Clause 15. The method of clause 6, wherein the determining the first energy efficiency of the first wireless communication connection comprises:
determining the first energy efficiency of the first wireless communication connection based on one or more physical uplink shared channel (PUSCH) communications transmitted over the first wireless communication connection.

Clause 16. The method of clause 15, wherein the determining the first energy efficiency of the first wireless communication connection based on the one or more PUSCH communications transmitted over the first wireless communication connection comprises:
determining the first energy efficiency of the first wireless communication connection based on the one or more PUSCH communications transmitted over the first wireless communication connection inclusive of padding bytes of the one or more PUSCH communications.

Clause 17. The method of clause 15, wherein the determining the first energy efficiency of the first wireless communication connection based on the one or more PUSCH communications transmitted over the first wireless communication connection comprises:
determining the first energy efficiency of the first wireless communication connection based on the one or more PUSCH communications transmitted over the first wireless communication connection exclusive of padding bytes of the one or more PUSCH communications.

Clause 18. The method of clause 6, wherein the determining the first energy efficiency of the first wireless communication connection comprises:
determining the first energy efficiency of the first wireless communication connection based on one or more of:
a path loss associated with the first wireless communication connection;

a throughput associated with the first wireless communication connection;
a bandwidth associated with the first wireless communication connection;
a power compliance limit associated with the first wireless communication connection; or
an amount of unutilized energy associated with the wireless communication connection.

Clause 19. The method of clause 1, wherein the allocating the available energy between the first wireless communication connection and the second wireless communication connection further comprises:
allocating the available energy between the first wireless communication connection and the second wireless communication connection for each of a plurality of energy measurement periods.

Clause 20. The method of clause 19, wherein the allocating the available energy between the first wireless communication connection and the second wireless communication connection for each of a plurality of energy measurement periods comprises:
allocating the available energy between the first wireless communication connection and the second wireless communication connection for an initial energy measurement period of the plurality of energy measurement periods based, at least in part, on a default energy allocation.

Clause 21. The method of clause 19, wherein the allocating the available energy between the first wireless communication connection and the second wireless communication connection for each of a plurality of energy measurement periods occurs periodically.

Clause 22. The method of clause 19, wherein the allocating the available energy between the first wireless communication connection and the second wireless communication connection for each of the plurality of energy measurement periods comprises:
allocating the available energy between the first wireless communication connection and the second wireless communication connection to minimize a difference between the first energy efficiency of the first wireless communication connection and the second energy efficiency of the second wireless communication connection.

Clause 23. The method of clause 1, further comprising:
performing a handover for at least one of the first wireless communication connection or the second wireless communication connection; and
allocating the available energy between the first wireless communication connection and the second wireless communication connection for an initial energy measurement period following the performing the handover based, at least in part, on an energy allocation different than a last energy allocation prior to the performing the handover.

Clause 24. The method of clause 1, wherein the available energy comprises an available reserve energy.

Clause 25. The method of clause 1, wherein the available energy comprises an available excess energy.

Clause 26. The method of clause 1, wherein:
the first wireless communication connection is associated with a first radio access technology (RAT);
the second wireless communication connection is associated with a second RAT different than the first RAT; and
the UE operates in a dual connectivity mode with the first wireless communication connection and the second wireless communication connection.

Clause 27. The method of clause 1, wherein:
the first wireless communication connection is associated with a first radio access technology (RAT);
the second wireless communication connection is associated with the first RAT; and
the UE operates in a carrier aggregation mode with the first wireless communication connection and the second wireless communication connection.

Clause 28. The method of clause 1, wherein:
the first wireless communication connection is associated with a first subscriber identity module (SIM); and
the second wireless communication connection is associated with a second SIM different than the first SIM.

Clause 29. The method of clause 1, further comprising:
establishing a third wireless communication connection; and
wherein the allocating the available energy between the first wireless communication connection and the second wireless communication connection further comprises:
allocating the available energy between the first wireless communication connection, the second wireless communication connection, and the third wireless communication connection.

Clause 30. The method of clause 1, further comprising:
switching operation of an antenna between a first antenna group and a second antenna group; and
allocating the available energy between the first wireless communication connection and the second wireless communication connection for an energy measurement period immediately following the switching the operation of the antenna based, at least in part, on energy measurement period occurring prior to the switching the operation of the antenna.

Clause 31. The method of clause 1, wherein the one or more functionalities associated with the first wireless communication connection comprise one or more of:
control channel functionality;
random access channel functionality;
voice communication functionality;
video communication functionality; or
signaling radio bearer (SRB) functionality.

Clause 32. The method of clause 1, further comprising:
monitoring for oversteering in the allocating the third portion of the available energy to at least one of the first wireless communication connection or the second wireless communication connection; and
reallocating, in response to detecting oversteering based on the monitoring, the third portion of the available energy between the first wireless communication connection and the second wireless communication connection such that the third portion of the available energy is allocated differently between the first wireless communication connection and the second wireless communication connection.

Clause 33. The method of clause 32, wherein the monitoring for oversteering comprises at least one of:
determining whether a hybrid automatic repeat request (HARQ) block error rate (BLER) satisfies a HARQ BLER threshold;
determining whether an allocated energy per byte satisfies an energy per byte threshold;
determining whether a byteLimit satisfies a byteLimit threshold;
determining whether a number of RLC retransmissions satisfies an RLC retransmission threshold;

determining whether a radio link failure has been initiated; or determining whether an uplink pathloss satisfies an uplink pathloss threshold.

Clause 34. The method of clause 32, wherein the reallocating the third portion of the available energy comprises at least one of:

reallocating the third portion of the available energy between the first wireless communication connection and the second wireless communication connection based on a default allocation;

reallocating the third portion of the available energy between the first wireless communication connection and the second wireless communication connection based on an even allocation; or reallocating the third portion of the available energy between the first wireless communication connection and the second wireless communication connection based on a step change in energy allocation.

Clause 35. The method of clause 32, wherein the reallocating the third portion of the available energy comprises at least one of:

returning to a prior energy allocation that did not result in detecting oversteering;

returning to a last energy allocation prior to detecting oversteering; or steering a preset amount of energy to a more inefficient wireless communication connection of the first wireless communication connection and the second wireless communication connection.

Clause 36. The method of clause 1, further comprising:
modifying, based on detecting oversteering, one or more threshold values associated with a monitored parameter; and monitoring for an indication of oversteering based on the one or more modified threshold values.

Clause 37. The method of clause 36, further comprising:
detecting, based on the monitoring for the indication of oversteering based on the one or more modified threshold values, the indication of oversteering; and maintain, in response to the detecting the indication of the oversteering, a current energy allocation of the third portion of the available energy between the first wireless communication connection and the second wireless communication connection.

Clause 38. The method of clause 37, further comprising:
reallocating, in response to a change in a relative efficiency of the first wireless communication connection and the second wireless communication connection, the third portion of the available energy between the first wireless communication connection and the second wireless communication connection differently than the current energy allocation.

Clause 39. The method of clause 1, further comprising:
monitoring for unutilized energy allocated to at least one of the first wireless communication connection or the second wireless communication connection; and reallocating, in response to detecting the unutilized energy based on the monitoring, the third portion of the available energy between the first wireless communication connection and the second wireless communication connection.

Clause 40. The method of clause 39, wherein the reallocating the third portion of the available energy comprises at least one of:

reallocating the third portion of the available energy based on a default energy allocation;

reallocating the third portion of the available energy based on an even energy allocation; or reallocating the third portion of the available energy based on a step change in energy allocation.

Clause 41. The method of clause 1, further comprising:
transmitting, based on detecting oversteering, a buffer status report (BSR) indicating an uplink buffer size of 0.

Clause 42. A user equipment (UE), comprising: a memory; a transceiver; and a processor in communication with the memory and the transceiver, wherein the UE is configured to perform any one or more aspects of clauses 1-41.

Clause 43. A user equipment (UE), comprising: one or more means to perform any one or more aspects of clauses 1-41.

Clause 44. A non-transitory computer-readable medium having program code recorded thereon for wireless communication by a user equipment (UE), the program code comprising code for causing the UE to perform any one or more aspects of clauses 1-41.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g., 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a closed subscriber group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a customer premises equipment (CPE), a cellular phone, a smart phone, a personal digital assistant (PDA), a wireless modem, a wireless device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, generating, investigating, looking up (e.g., looking up in a table, a database, or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the physical (PHY) layer. In the case of a UE (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer-readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read-Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, or a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

The invention claimed is:

1. A user equipment (UE), comprising:
one or more memories; and
one or more processors coupled to the one or more memories, the one or more memories storing instructions executable by the one or more processors, individually or in any combination, to cause the UE to:
establish a first wireless communication connection;
establish a second wireless communication connection; and
allocate an available energy between the first wireless communication connection and the second wireless communication connection by:
allocating a first portion of the available energy to the first wireless communication connection based at least in part on one or more functionalities associated with the first wireless communication connection;

allocating a second portion of the available energy to the second wireless communication connection based at least in part on one or more functionalities associated with the second wireless communication connection; and allocating a third portion of the available energy to at least one of the first wireless communication connection or the second wireless communication connection based at least in part on a first energy efficiency of the first wireless communication connection and a second energy efficiency of the second wireless communication connection.

2. The UE of claim 1, wherein:

the first energy efficiency of the first wireless communication connection is based on an energy per byte of one or more communications transmitted over the first wireless communication connection; and the second energy efficiency of the second wireless communication connection is based on an energy per byte of one or more communications transmitted over the second wireless communication connection.

3. The UE of claim 2, wherein:

the first energy efficiency of the first wireless communication connection is based on a first power compliance limit associated with the one or more communications transmitted over the first wireless communication connection; and the second energy efficiency of the second wireless communication connection is based on a second power compliance limit associated with the one or more communications transmitted over the second wireless communication connection.

4. The UE of claim 1, wherein the one or more memories further store instructions executable by the one or more processors, individually or in any combination, to cause the UE to:

determine the first energy efficiency of the first wireless communication connection; and determine the second energy efficiency of the second wireless communication connection.

5. The UE of claim 4, wherein the one or more memories further store instructions executable by the one or more processors, individually or in any combination, to cause the UE to determine the first energy efficiency of the first wireless communication connection by:

determining the first energy efficiency of the first wireless communication connection based on one or more communications transmitted over the first wireless communication connection during a first period.

6. The UE of claim 5, wherein the one or more memories further store instructions executable by the one or more processors, individually or in any combination, to cause the UE to determine the second energy efficiency of the second wireless communication connection by:

determining the second energy efficiency of the second wireless communication connection based on one or more communications transmitted over the second wireless communication connection during the first period.

7. The UE of claim 5, wherein the one or more memories further store instructions executable by the one or more processors, individually or in any combination, to cause the UE to determine the second energy efficiency of the second wireless communication connection by:

determining the second energy efficiency of the second wireless communication connection based on one or more communications transmitted over the second wireless communication connection during a second period, the second period being different than the first period.

8. The UE of claim 7, wherein:

the first period is a current energy measurement period and the second period is a previous energy measurement period occurring prior to the current energy measurement period; and wherein the one or more memories further store instructions executable by the one or more processors, individually or in any combination, to cause the UE to:

determine to base the second energy efficiency on the one or more communications transmitted over the second wireless communication connection during the second period instead of the first period based on at least one of:

the UE not receiving any uplink grants associated with the second wireless communication connection during the first period;

a number of uplink grants for the UE associated with the second wireless communication connection during the first period not satisfying a threshold;

no physical uplink shared channel (PUSCH) communications by the UE during the first period; or a time period not expiring, wherein the time period is based on at least one of a time correlation associated with the second wireless communication connection or a predetermined amount of time.

9. The UE of claim 4, wherein the one or more memories further store instructions executable by the one or more processors, individually or in any combination, to cause the UE to determine the first energy efficiency of the first wireless communication connection by:

determining the first energy efficiency of the first wireless communication connection based on one or more physical uplink shared channel (PUSCH) communications transmitted over the first wireless communication connection.

10. The UE of claim 9, wherein the one or more memories further store instructions executable by the one or more processors, individually or in any combination, to cause the UE to determine the first energy efficiency of the first wireless communication connection based on the one or more PUSCH communications transmitted over the first wireless communication connection by:

determining the first energy efficiency of the first wireless communication connection based on the one or more PUSCH communications transmitted over the first wireless communication connection inclusive of padding bytes of the one or more PUSCH communications.

11. The UE of claim 9, wherein the one or more memories further store instructions executable by the one or more processors, individually or in any combination, to cause the UE to determine the first energy efficiency of the first wireless communication connection based on the one or more PUSCH communications transmitted over the first wireless communication connection by:

determining the first energy efficiency of the first wireless communication connection based on the one or more PUSCH communications transmitted over the first wireless communication connection exclusive of padding bytes of the one or more PUSCH communications.

12. The UE of claim 4, wherein the one or more memories further store instructions executable by the one or more processors, individually or in any combination, to cause the UE to determine the first energy efficiency of the first wireless communication connection by:

determining the first energy efficiency of the first wireless communication connection based on one or more of:
a path loss associated with the first wireless communication connection;
a throughput associated with the first wireless communication connection;
a bandwidth associated with the first wireless communication connection;
a power compliance limit associated with the first wireless communication connection; or
an amount of unutilized energy associated with the first wireless communication connection.

13. The UE of claim 1, wherein the one or more memories further store instructions executable by the one or more processors, individually or in any combination, to cause the UE to allocate the available energy between the first wireless communication connection and the second wireless communication connection by:
allocating the available energy between the first wireless communication connection and the second wireless communication connection for each of a plurality of energy measurement periods.

14. The UE of claim 13, wherein the one or more memories further store instructions executable by the one or more processors, individually or in any combination, to cause the UE to allocate the available energy between the first wireless communication connection and the second wireless communication connection for each of a plurality of energy measurement periods by:
allocating the available energy between the first wireless communication connection and the second wireless communication connection for an initial energy measurement period of the plurality of energy measurement periods based, at least in part, on a default energy allocation.

15. The UE of claim 13, wherein the one or more memories further store instructions executable by the one or more processors, individually or in any combination, to cause the UE to allocate the available energy between the first wireless communication connection and the second wireless communication connection for each of the plurality of energy measurement periods by:
allocating the available energy between the first wireless communication connection and the second wireless communication connection to minimize a difference between the first energy efficiency of the first wireless communication connection and the second energy efficiency of the second wireless communication connection.

16. The UE of claim 1, wherein the one or more memories further store instructions executable by the one or more processors, individually or in any combination, to cause the UE to:
perform a handover for at least one of the first wireless communication connection or the second wireless communication connection; and
allocate the available energy between the first wireless communication connection and the second wireless communication connection for an initial energy measurement period following the performing the handover based, at least in part, on an energy allocation different than a last energy allocation prior to the performing the handover.

17. The UE of claim 1, wherein the available energy comprises at least one of an available reserve energy or an available excess energy.

18. The UE of claim 1, wherein:
the first wireless communication connection is associated with a first radio access technology (RAT);
the second wireless communication connection is associated with a second RAT different than the first RAT; and
the UE operates in a dual connectivity mode with the first wireless communication connection and the second wireless communication connection.

19. The UE of claim 1, wherein:
the first wireless communication connection is associated with a first radio access technology (RAT);
the second wireless communication connection is associated with the first RAT; and
the UE operates in a carrier aggregation mode with the first wireless communication connection and the second wireless communication connection.

20. The UE of claim 1, wherein:
the first wireless communication connection is associated with a first subscriber identity module (SIM); and
the second wireless communication connection is associated with a second SIM different than the first SIM.

21. The UE of claim 1, wherein the one or more memories further store instructions executable by the one or more processors, individually or in any combination, to cause the UE to:
establish a third wireless communication connection; and
wherein the one or more memories further store instructions executable by the one or more processors, individually or in any combination, to cause the UE to allocate the available energy between the first wireless communication connection and the second wireless communication connection by:
allocating the available energy between the first wireless communication connection, the second wireless communication connection, and the third wireless communication connection.

22. The UE of claim 1, wherein the one or more memories further store instructions executable by the one or more processors, individually or in any combination, to cause the UE to:
switch operation of an antenna between a first antenna group and a second antenna group; and
allocate the available energy between the first wireless communication connection and the second wireless communication connection for an energy measurement period immediately following the switching the operation of the antenna based, at least in part, on energy measurement period occurring prior to the switching the operation of the antenna.

23. The UE of claim 1, wherein the one or more memories further store instructions executable by the one or more processors, individually or in any combination, to cause the UE to:
monitor for oversteering in the allocating the third portion of the available energy to at least one of the first wireless communication connection or the second wireless communication connection; and
reallocate, in response to detecting oversteering based on the monitoring, the third portion of the available energy between the first wireless communication connection and the second wireless communication connection such that the third portion of the available energy is allocated differently between the first wireless communication connection and the second wireless communication connection.

24. The UE of claim 23, wherein the one or more memories further store instructions executable by the one or more processors, individually or in any combination, to cause the UE to monitor for the oversteering by:
- determining whether a hybrid automatic repeat request (HARQ) block error rate (BLER) satisfies a HARQ BLER threshold;
- determining whether an allocated energy per byte satisfies an energy per byte threshold;
- determining whether a byteLimit satisfies a byteLimit threshold;
- determining whether a number of RLC retransmissions satisfies an RLC retransmission threshold;
- determining whether a radio link failure has been initiated; or
- determining whether an uplink pathloss satisfies an uplink pathloss threshold.

25. The UE of claim 23, wherein the one or more memories further store instructions executable by the one or more processors, individually or in any combination, to cause the UE to reallocate the third portion of the available energy by:
- reallocating the third portion of the available energy between the first wireless communication connection and the second wireless communication connection based on a default allocation;
- reallocating the third portion of the available energy between the first wireless communication connection and the second wireless communication connection based on an even allocation; or
- reallocating the third portion of the available energy between the first wireless communication connection and the second wireless communication connection based on a step change in energy allocation.

26. The UE of claim 23, wherein the one or more memories further store instructions executable by the one or more processors, individually or in any combination, to cause the UE to reallocate the third portion of the available energy by:
- returning to a prior energy allocation that did not result in detecting oversteering;
- returning to a last energy allocation prior to detecting oversteering; or
- steering a preset amount of energy to a more inefficient wireless communication connection of the first wireless communication connection and the second wireless communication connection.

27. The UE of claim 1, wherein the one or more memories further store instructions executable by the one or more processors, individually or in any combination, to cause the UE to:
- modify, based on detecting oversteering, one or more threshold values associated with a monitored parameter; and
- monitor for an indication of oversteering based on the one or more modified threshold values.

28. The UE of claim 27, wherein the one or more memories further store instructions executable by the one or more processors, individually or in any combination, to cause the UE to:
- detect, based on the monitoring for the indication of oversteering based on the one or more modified threshold values, the indication of oversteering; and
- maintain, in response to the detecting the indication of the oversteering, a current energy allocation of the third portion of the available energy between the first wireless communication connection and the second wireless communication connection.

29. The UE of claim 1, wherein the one or more memories further store instructions executable by the one or more processors, individually or in any combination, to cause the UE to:
- monitor for unutilized energy allocated to at least one of the first wireless communication connection or the second wireless communication connection; and
- reallocate, in response to detecting the unutilized energy based on the monitoring, the third portion of the available energy between the first wireless communication connection and the second wireless communication connection.

30. The UE of claim 1, wherein the one or more memories further store instructions executable by the one or more processors, individually or in any combination, to cause the UE to:
- transmit, based on detecting oversteering, a buffer status report (BSR) indicating an uplink buffer size of 0.

* * * * *